United States Patent [19]
Kameda et al.

[11] Patent Number: 5,627,826
[45] Date of Patent: May 6, 1997

[54] TIME-SLOT INTERCHANGER

[75] Inventors: Masaru Kameda; Yukio Suda; Toshiaki Ookubo, all of Oyama; Hiroshi Yoshida, Kawasaki, all of Japan

[73] Assignee: Fujitsu Limited, Kawasaki, Japan

[21] Appl. No.: 444,298

[22] Filed: May 18, 1995

[30] Foreign Application Priority Data

Oct. 11, 1994  [JP]  Japan ................................. 6-245207

[51] Int. Cl.$^6$ ..................................................... H04Q 11/04
[52] U.S. Cl. ............................................ 370/371; 370/376
[58] Field of Search ............................ 370/63, 68, 58.1, 370/58.2, 59, 64, 65.5, 66, 67, 55

[56] References Cited

U.S. PATENT DOCUMENTS

| | | | |
|---|---|---|---|
| 4,380,064 | 4/1983 | Ishikawa | 370/63 |
| 4,701,907 | 10/1987 | Collins | 370/63 |
| 4,704,716 | 11/1987 | Bowers et al. | 370/63 |
| 4,718,058 | 1/1988 | van Vugt | 370/63 |
| 4,845,705 | 7/1989 | Dorgelo | 370/63 |

FOREIGN PATENT DOCUMENTS 5-227556  9/1993  Japan .

*Primary Examiner*—Wellington Chin
*Assistant Examiner*—Huy D. Vu
*Attorney, Agent, or Firm*—Staas & Halsey

[57] ABSTRACT

A time-slot interchanger includes first and second time switches and a space switch installed between the first and second time switches. The first time switch includes a first part for supplying data, which is produced by adding a blank region to input data supplied to the first time switch, in n systems (n is an integer), in parallel to the space switch. And the second time switch includes a second part for supplying output data, which is produced by removing the blank region from data received in the n systems and in parallel from the space switch.

14 Claims, 32 Drawing Sheets

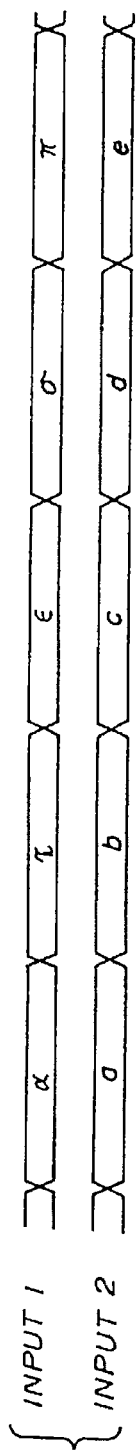
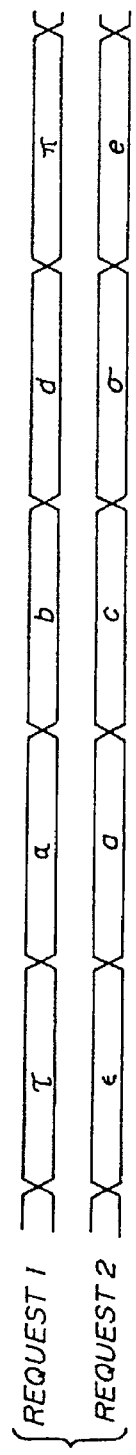
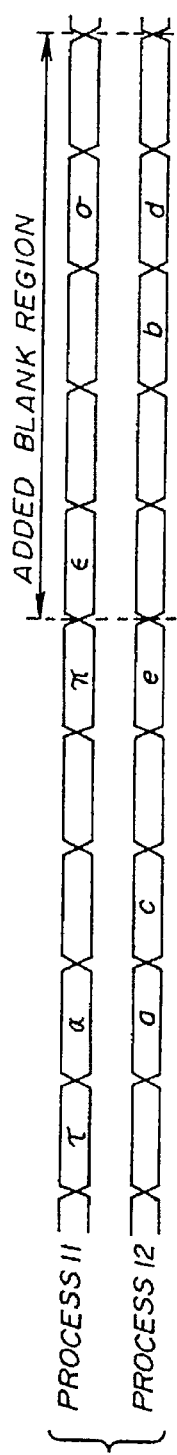
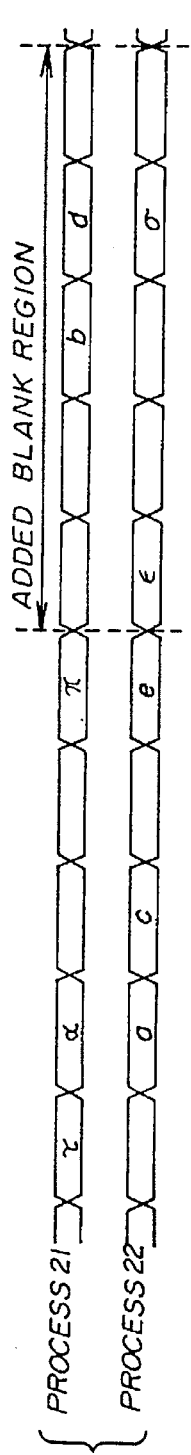
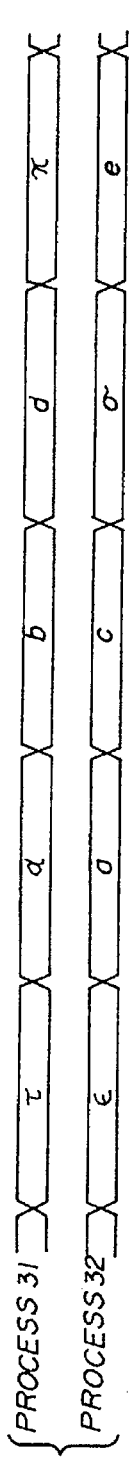

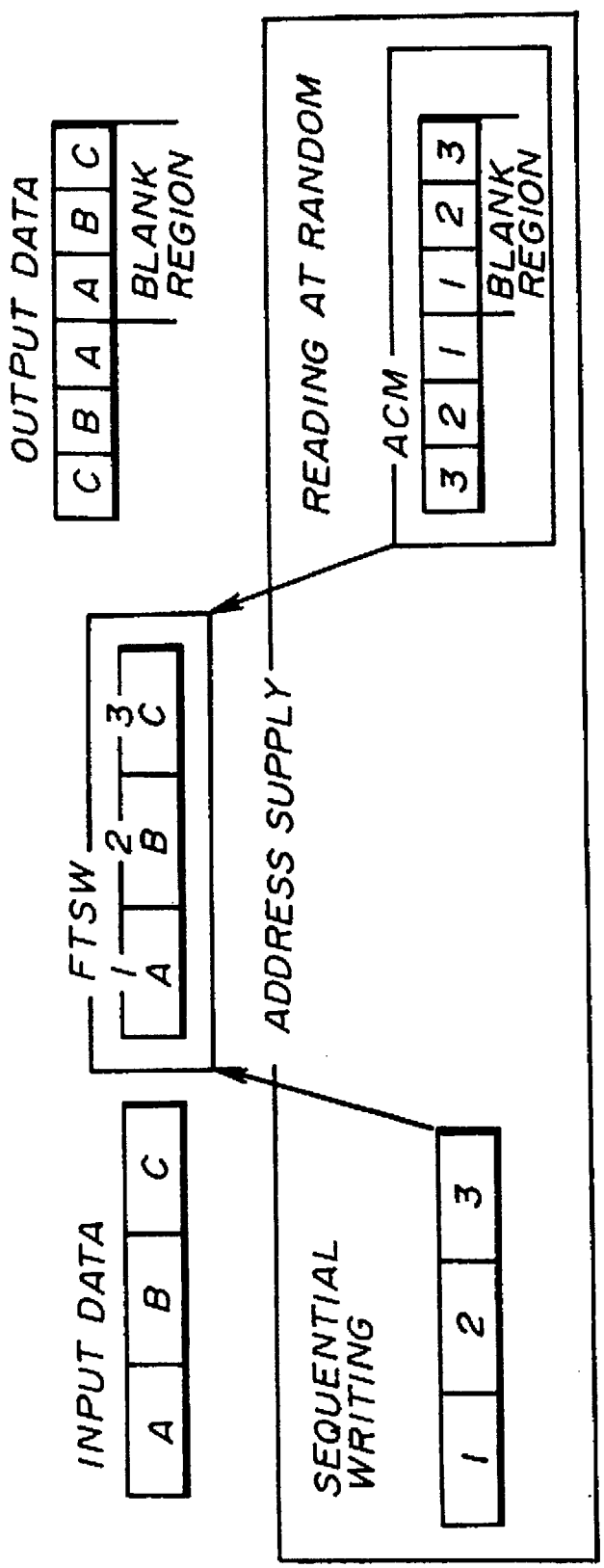

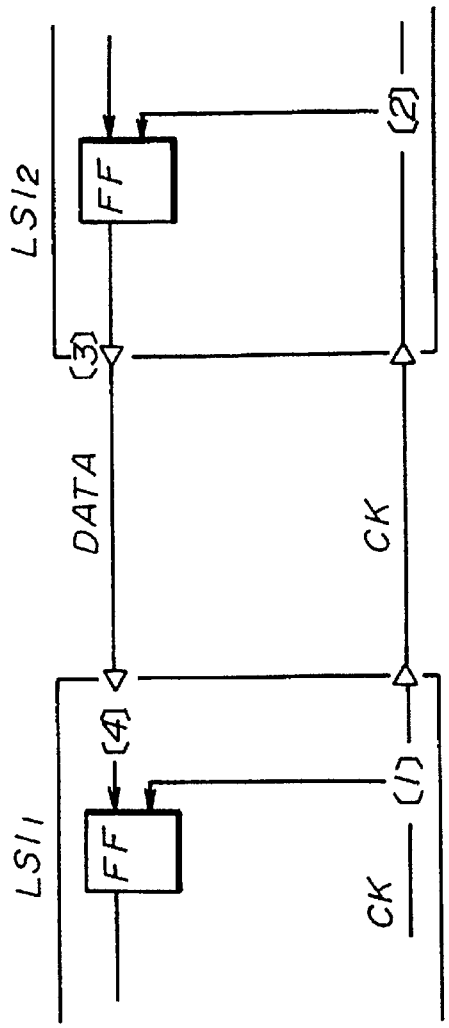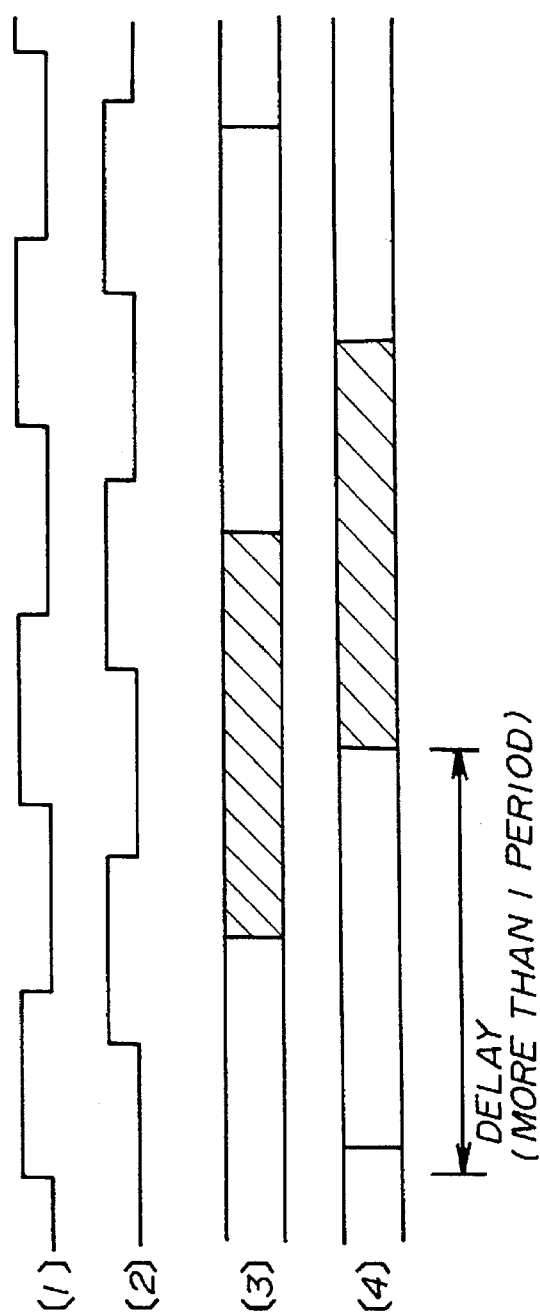
FIG.10A PRIOR ART
FIG.10B PRIOR ART

1

TIME-SLOT INTERCHANGER

BACKGROUND OF THE INVENTION

1. Field of the Invention

The present invention generally relates to a time-slot interchanger (TSI), and more particularly, to a time-slot interchanger which performs circuit cross connecting in a synchronous multiplexer used in a digital synchronous network.

2. Description of the Prior Art

In a digital synchronous network, by interchanging time slots in a digital multiplex signal, it becomes possible to perform circuit cross connecting in a time scale, instead of space cross connecting in a distribution frame which has been performed in a conventional analog network. To perform such circuit cross connecting, a synchronous multiplexer is in practical use. A circuit-cross-connecting function in the synchronous multiplexer is performed by a time-slot interchanger which interchanges time-and-space time slot positions in a data sequence. If the time-slot interchanger is constructed such that an order of interchanged time slots is controllable by an external signal, a controllable time switch may be realized.

FIG. 1 shows an example of a network using such a synchronous multiplexer. In FIG. 1, 4 add-drop multiplexers (ADM) are connected in a ring form through optical fiber cables. Between two of the ADMs, a multiplexed optical signal is transmitted through the optical fiber cable. Each of the ADMs is connected to a multiplexer (not shown).

FIG. 2 shows an example of a digital hierarchy of a multiplexed signal in the network shown in FIG. 1. The digital hierarchy shown in FIG. 2 comprises a first-order group to a sixth-order group. The ADMs shown in FIG. 1 transmit a fourth-order group signal STM-1 or a fifth-order group signal STM-4 to each other through the optical fiber cables. And the multiplexers (not shown) connected to the ADMs have a function of processing a third-order group signal shown in FIG. 2. In FIG. 2, C-n indicates a container, VC-n indicates a virtual container, TU-n indicates a tributary container, AU-n indicates an administrative unit, and STM-n indicates a synchronous transport module. Such a digital hierarchy is described in detail in other articles, for example, CCITT G707, G708, G709, and BT SPEC RC8876C.

FIG. 3 shows a configuration of the ADM shown in FIG. 1. In FIG. 3, each of the ADMs transmits the fifth-order signal STM-4 through the optical fiber cables (channel #1 and channel #2). In the ADM, for each channel #1, #2, an optic-to-electronic converter OR, a multiplexer MUX, and a demultiplexer DMUX are installed.

The multiplexer MUX multiplexes 4 fourth-order group signals STM-1, and produces the fifth-order group signal STM-4. The demultiplexer DMUX demultiplexes the fifth-order group signal STM-4 and produces the 4 fourth-order group signals STM-1. The multiplexer MUX and demultiplexer DMUX are connected to two multiplex/demultiplex equipment MUX/DMUX as shown in FIG. 3.

The demultiplexed signals STM-1 are supplied to ports DROP of one MUX/DMUX, and the signals STM-1 to be multiplexed are produced from port ADD of the other MUX/DMUX. And the one MUX/DMUX receives STM-1 signals from a lower-level multiplexer (not shown), and the other MUX/DMUX produces STM-1 signals to the lower-level multiplexer (not shown).

Further, between the two multiplex/demultiplex equipment MUX/DMUX, a time-slot interchanger TSI performing the circuit cross connecting is connected as shown in FIG. 3. As mentioned above, the time-slot interchanger TSI can interchange the time-slot positions in the data sequence in both the time scale and space scale.

FIG. 4 shows an illustration representing a concept of the time-slot interchanger TSI. Input data sequences 1C, 1B, 1A, and 2C, 2B, 2A are converted to parallel data in DMUXs. And in the time-slot interchanger TSI, time slots of the parallel data are interchanged in the time scale and space scale, and are output as serial data from MUXs.

FIG. 5 shows an illustration representing data processing of the time-slot interchanger TSI. Interchange of the time-slot position in the data sequence in the time scale and space scale are performed by a time-space-time (TST) function which includes 2 time switches of a front time switch (FTSW) and a rear time switch (RTSW), and 1 space switch (SSW). These three switches operate at the same timing.

Three data sequences A, B, and C, whose times-lot positions are respectively interchanged in the front time switch FTSW, are output to the space switch SSW. In the front time switch FTSW, a blank region is added to each of the data sequences. Thus, an amount of data doubles. Therefore, each switch needs to operate at twice a bit rate of the data sequence.

In the front switch FTSW which is constructed with memories, the input data sequence is written into the memory according to a sequential writing address supplied from a program counter (PG), and then, according to a random reading out address supplied from an address control memory ACM, sequentially written input data is read out at random.

The space switch SSW interchanges in the space scale the time-slot positions of the received data, and produces it to the rear time switch RTSW. The space switch SSW is also constructed with memories. This space interchange of the time-slot positions is controlled by producing a selection signal SEL (address) to be given to this switch from the switch control memory ACM.

The rear time switch RTSW is also constructed with memories. In the rear time switch RTSW, the input data from the space switch SSW is written into the memory according to the sequential writing address, and written data is read out at random according to a random reading address supplied from the switch control memory ACM.

In this way, the time-slot positions in the input data are interchanged in the time scale and space scale, as shown in FIG. 5.

FIGS. 6A to 6E shows illustrations for explaining the blank region shown in FIG. 5. The blank region is used for preventing a blocking from generating in the operation of the space switch SSW.

Now, two input data sequences, an input 1 and an input 2, are represented in FIG. 6A. The input 1 includes data α, τ, ε, σ, π, and the input 2 includes data a, b, c, d, e. The input 1 and the input 2 are sequentially written into memories in front time switch FTSW. Output data sequences of the TST function are represented by a request 1 and a request 2, as shown in FIG. 6B. In this case, the blocking can be prevented by using the blank regions as shown in FIGS. 6C and 6D.

FIG. 6C shows operations of the front time switch FTSW (which are represented as a process 11 and a process 12). In an example shown in FIG. 6C, the blocking between the data τ and the data ε, and the blocking between the data c and the data b are prevented. In the process 11, requested slots for the data τ and the data ε are set at the same time, but it is not difficult to read out both the data τ and the data ε from the memory in the FTSW at the same time. The above also covers the process 12 for the data c and the data b. Therefore, one of the data τ and the data ε and one of the data c and the data b need to be moved to the blank region. In the example shown in FIG. 6C, the data ε and the data b are moved to the blank region. And in the same example, the data σ and the data d, which are output to another data sequence, are also moved to the blank region. In the drawing, a slot in which a designation of data is not written is meant to have the same data as that of a previous slot.

Then, as shown in FIG. 6D, in processes of the space switch (a process 21 and a process 22), an interchange of the slots including the blank region is performed in the space scale. In an example shown in FIG. 6D, the data d and the data σ are interchanged, the data b is moved to an upper-side channel, and the data ε is moved to a lower-side channel.

Finally, as shown in FIG. 6E, in processes of the rear time switch RTSW (a process 31 and a process 32), unnecessary data corresponding to an amount of blank region is removed.

In this way, by adding the blank region, which has the same amount of data as that of the input data sequence, to the input data sequence, and processing the data at twice the bit rate of the input data sequence in each switch, the blocking may be prevented.

FIG. 7 shows a frame format of the signal STM-1 processed by the time-slot interchanger TSI shown in FIG. 3. The input data sequence (STM-1) constructs one frame with 270 bytes×9 ROW. This one frame comprises an overhead region (OHB: 9 bytes×9 ROW), and a data (payload) region (261 bytes×9 ROW). To such a single frame of the STM-1, a blank region of 270 bytes×9 ROW is added.

FIGS. 8A to 8C show illustrations for explaining in further detail the operation of the TST function in the conventional time-slot interchanger TSI. FIG. 8A shows an operation of the front time switch FTSW, FIG. 8B shows an operation of the space switch SSW, and FIG. 8C shows an operation of the rear time switch RTSW.

In FIG. 8A, the input data sequence is sequentially written into the front time switch FTSW (memory) in order of addresses 1, 2, 3, and is read out at random according to the addresses supplied from the switch control memory ACM. In this reading operation, to prevent the above-mentioned blocking, a blank region is added to the input data. In an example shown in FIG. 8A, the blank region comprising the data A, B, C is added to the end of the data sequence C, B, A.

The output data read out from the front time switch FTSW then is transmitted to the space switch SSW, as shown in FIG. 8B. In an example shown in FIG. 8B, the space switch SSW can receive the output data from three front time switches FTSWs. The operation of the space switch SSW is controlled by the addresses stored in the switch control memory ACM. For example, for an output channel #1 of the space switch SSW, the switch control memory ACM stores addresses 3, 1, 3 for the output data and also stores addresses 2, 3, 1 for the blank region. According to the addresses, to the channel #1, the output data of M, B, 0 and the blank-region data J, Q, F are produced. The same operation is performed in other channels.

Next, the output data of the space switch SSW shown in FIG. 8B is supplied to the rear time switch RTSW, as shown in FIG. 8C. The output data from the time switch SSW is sequentially written into the rear time switch RTSW (memory), and the data is produced according to the addresses supplied from the switch control memory ACM. In an example shown in FIG. 8C, the data sequence C, B, A, A, B, C is sequentially written into the rear time switch RTSW, and are interchanged according to the random addresses supplied from the ACM. And then, only the data C, B, A is read out from the rear time switch RTSW.

FIG. 9 shows a block diagram of the conventional time-slot interchanger TSI for realizing the data processing show in FIG. 8. This time-slot interchanger TSI has n-systems (n channels: n is an integer). Each channel has the front time switch FTSW and the rear time switch RTSW which are constructed with the memories, and one space switch SSW which is commonly used by the all channels.

Further, the switch control memory ACM is equipped with each switch. The switch control memories ACMs connected to the front time switch FTSW and the space switch SSW are controlled by an ACM-access-selection control unit ASLC. And the switch control memory connected to the rear time switch RTSW is controlled by an access control unit ACU. The access control unit ACU also controls the ACM-access-selection control unit ASLC.

The time-slot interchanger TSI mentioned above is controlled by a microprocessor unit MPU. The microprocessor unit comprises an address-control division unit ACD and a channel/column converter CCC. The front time switch, the rear time switch, and the space switch SSW are operative at the same external timing signal which is supplied to each switch control memory.

The MPU receives information set by a user. The information includes a length of each data (signal), and connection information of each channel. On the contrary, information requested by each switch is connection information of a byte unit. The channel/column converter CCC of the MPU has a function of converting a channel number input by the user to a byte number. The address-control division unit ACD determines how to connect the switches of the TST such that the connection information of each byte doesn't block each other, and produces determined connection information to the access control unit ACU. Each switch control memory ACM stores respective switch connection information which has been determined in the ACD.

Now, an operation of the time-slot interchanger TSI will be described. First, the information set by the user is converted to the connection information indicated in the byte unit by the channel/column converter CCC and the address-control division unit ACD, and the converted connection information is stored in the switch control memory ACM of each switch. This stored connection information is used for the reading address of the front time switch FTSW and the rear time switch RTSW.

As mentioned before, in each time switch, the input data is sequentially written into the time switch, and is temporarily stored, and then, is read out according to the connection information (address) from the switch control memory ACM. In this way, the slot interchange in the time scale is performed. In this interchange, to prevent the blocking, the blank region is added to the input data to produce twice the mount of the data in the front time switch FTSW, and the blank region is removed to produce only the required data having half the data input to the rear time switch RTSW. The time switch SSW interchanges the slots in the space scale. Therefore, there is no need for the switch to store the input data, and the data selection is performed according to the data supplied from the switch control memory ACM.

However, the above conventional techniques have the following problems:

(1) Recently, LSI technology is developing remarkably, and many efforts are directed to a miniaturization of a device by integrating separate functions into one LSI circuit. However, there still are restrictions of an operating speed, a circuit size, etc., and these restrictions are obstacles to realizing functions in a circuit design.

In further detail, to prevent the above-mentioned blocking, in the time-slot interchanger TSI, the blank region is added, and the data needs to be processed at twice the bit rate of the input data. For example, in FIG. 9, on the assumption that the bit rate of each input data is 19 Mbps, the data, to which the blank region is added, needs to be processed at a 38-Mbps operating speed. Each switch handling this data is usually constructed with CMOS circuits which may be extended to a large-scale gate. Therefore, there is a problem that a large power consumption is necessary for processing the data at 38 Mbps. Namely, the higher the bit rate of the data to be processed, the larger the power consumption. Therefore, it is not desired to process the 19-Mbps data at 38 Mbps from a standpoint of the power consumption.

(2) When the bit rate of the data is high, a problem that it is difficult to construct an interface circuit appears in addition to the high power consumption. A description of this problem will be given as follows by referring to FIGS. 10A and 10B. FIGS. 10A and 10B show illustrations for explaining the problem in the conventional device.

FIG. 10A shows one case that an LSI2 produces data to an LSI1 in response to a clock signal CK from the LSI1. FIG. 10B shows time charts of signals at points [1] to [4] shown in FIG. 10A. In this case, the clock signal CK produced from the LSI1 is delayed in a transmission line to the LSI2, and as shown in the time chart [2] of FIG. 10B, the LSI2 receives a delayed clock signal. In synchronization with the delayed clock signal CK, a flip-flop FF in the LSI2 produces the data to the LSI1 at a timing (shaded part) shown in time chart [3]of FIG. 10B. The data produced from the LSI2 is also delayed in the transmission line to the LSI1. If the data is delayed by more than one period of the clock signal CK from a first rising edge thereof as shown in a time chart [4](shaded part ) of FIG. 10B, a flip-flop FF in the LSI1 cannot receive the delayed data at a second rising edge of the clock signal CK. In this way, when there is a large delay, a synchronous operation may not be performed. Further, for a higher clock speed, the above problem becomes remarkable.

Such a problem may occur at interfaces between the front time switch FTSW and the space switch, and between the space switch and the rear time switch. Therefore, to ensure data transmissions between them, it is not desired that the bit rate of the data be high.

(3) As shown in FIG. 9, each switch is operative at a single timing signal supplied from outside of the time-slot interchanger TSI. However, when a new time-slot interchanger TSI is designed for a conventional network, it is difficult to design the TSI such that a timing of the new TSI coincides with a timing of the conventional TSI. There is thus a problem that the conventional time-slot interchanger TSI shown in FIG. 9 has a disadvantages of a lack of application flexibility.

SUMMARY OF THE INVENTION

It is an object of this invention to provide a time-slot interchanger which operates at a low operating speed, and ensures a data transmission with a low power consumption, in which the disadvantages described above are eliminated.

A more specific object of the present invention is to provide a time-slot interchanger having flexibility.

The objects described above are achieved by a time-slot interchanger comprising: first and second time switches; and a space switch installed between the first and second time switches; wherein: the first time switch comprises a first part for supplying data, which is produced by adding a blank region to input data supplied to the first time switch, in n systems (n is an integer) and in parallel to the space switch; and the second time switch comprises a second part for supplying output data, which is produced by removing the blank region from data received in the n systems and in parallel from the space switch.

The object described above is also achieved by the time-slot interchanger mentioned above, wherein the data produced in the n systems and in parallel from the first time switch has the same bit rate as that of the input data supplied to the first time switch.

The object described above is also achieved by the time-slot interchanger mentioned above, wherein the data produced in the n systems and in parallel from the first time switch has n times an amount of the input data supplied to the first time switch.

The object described above is also achieved by the time-slot interchanger mentioned above, wherein the first part comprises a memory having one write port and n read ports, and the first part reads out the data from the memory by providing n read addresses to supply it to the space switch.

The object described above is also achieved by the time-slot interchanger mentioned above, wherein the second part comprises a memory having n write ports and one read port, and the second part writes the data produced from the space switch in n systems and in parallel into the memory by supplying one write address.

The object described above is also achieved by the time-slot interchanger mentioned above, wherein the space switch comprises n memories, and stores the data read out from the first time switch in the n systems and in parallel.

The object described above is also achieved by the time-slot interchanger mentioned above, wherein the first part comprises n memories having one write port and one read port, and the first part writes the data supplied to the first part into the n memories and reads out them by respectively supplying n write addresses and n read addresses.

The object described above is also achieved by the time-slot interchanger mentioned above, wherein the second part comprises n memories having one write port and one read port and a selection part for selecting one of the data read out from the n memories, and the second part writes the data produced from the space switch in n systems and in parallel into the n memories by supplying n write addresses and reads the data by supplying n read addresses, and further removes the blank region by selecting in the selection part.

The object described above is also achieved by the time-slot interchanger mentioned above, wherein: the first part comprises two memories for alternatively writing the input data and alternatively reading; the space switch comprises two memories for alternatively writing the data produced from the first part and alternatively reading; and the second part comprises two memories for alternatively writing the data produced from the space switch and alternatively reading.

The object described above is also achieved by the time-slot interchanger mentioned above, wherein the time-slot interchanger comprises: a first timing change circuit, set before the first time switch, for synchronizing the input data supplied to the first time switch to an internal timing signal; and a second timing change circuit, set after the second time switch, for synchronizing the output data produced from the second time switch to an external timing signal.

The object described above is also achieved by the time-slot interchanger mentioned above, wherein the time-slot interchanger comprises: a pass-check-bit insertion part for adding a pass-check bit to the input data supplied to the first time switch; and a pass-check-bit detection part for detecting the pass-check bit added to the output data produced from the second time switch, and for determining whether or not the data is accurately cross-connected by comparing with an expected value.

The object described above is also achieved by the time-slot interchanger mentioned above, wherein the pass-check-bit insertion part comprises a part for adding the pass check bit each given unit of the input data supplied to the first time switch.

The object described above is also achieved by the time-slot interchanger mentioned above, wherein the time-slot interchanger further comprises a part for setting data to be detected, and the pass-check-bit detection part compares the pass check bit which is added to set data with the expected value.

According to the time-slot interchanger, the data including the blank region is processed in n systems and in parallel though the conventional device serially adds the blank region to the data. Therefore, there is no need to increase the bit rate of the data processing. Thus, the above enables the bit rate of the data produced in the n systems and in parallel to be same as the bit rate of the input data supplied to the first time switch. As a result, the time-slot interchanger according to the present invention may surely cross connect with a low power consumption.

And according to the time-slot interchanger, the amount of the data produced in the n systems and in parallel is n times the amount of the data supplied to the first switch. Therefore, the addition of the blank region may prevent a blocking from generation.

According to the time-slot interchanger in which the data is processed in the n systems and in parallel, the circuit cross connecting may be carried out at the same bit rate as that of the input data.

According to the time-slot interchanger, the first part comprises the two memories for alternatively writing the input data and alternatively reading, the space switch comprises the two memories for alternatively writing the data produced from the first part and alternatively reading, and the second part comprises the two memories for alternatively writing the data produced from the space switch and alternatively reading. Therefore, the circuit cross connecting and a circuit interchanging may be efficiently performed.

According to the time-slot interchanger, the time-slot interchanger comprises the first timing change circuit, set before the first time switch, for synchronizing the input data supplied to the first time switch to the internal timing signal, and the second timing change circuit, set after the second time switch, for synchronizing the output data produced from the second time switch to the external timing signal. Therefore, the circuit cross connecting may be carried out at the internal timing which is different from the external timing.

And according to the time-slot interchanger, the pass-check bit is added to the data or the pass-check bit is added to each given unit of the input data supplied to the first time switch. Therefore, the pass-check function of the time-slot interchanger may be flexibly adjusted to a variety of data formats, and the above may ensure the pass check.

Further according to the time-slot interchanger, the data to be checked may be set. Therefore, the pass check may be efficiently carried out.

Other objects and further features of the present invention will be apparent from the following detailed description when read in conjunction with the accompanying drawings.

BRIEF DESCRIPTION OF THE DRAWINGS

FIGS. 6A to 6E shows illustrations for explaining a blocking generation and a blank region for preventing the blocking;

FIGS. 8A to 8C show illustrations for explaining in further detail an operation of a TST function in the conventional time-slot interchanger TSI;

FIGS. 10A and 10B show illustrations for explaining a problem in the conventional time-slot interchanger;

DESCRIPTION OF THE PREFERRED EMBODIMENTS

Figure 11A:
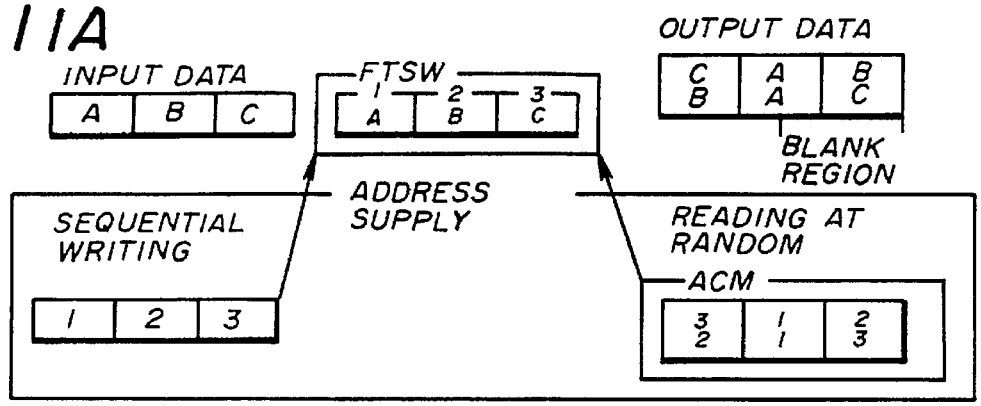
FIGS. 11A to 11C show illustrations for explaining an operation principle of a TST function in a first embodiment of a time-slot interchanger TSI according to the present invention.

First, a description will be given of an operation principle of a first embodiment of a time-slot interchanger according to the present invention, by referring to FIGS. 11A to 11C. FIG. 11A shows a data process of a front time switch FTSW of the time-slot interchanger TSI, FIG. 11B shows a data process of a space switch SSW thereof, and FIG. 11C shows a data process of a rear time switch RTSW thereof.

In FIG. 11A, input data is sequentially written into the front time switch FTSW, and an amount of data which is double an amount of the input data is simultaneously read out at random. This double reading can be performed by using, for example, two memories or a dual-read-out memory. This random reading is performed according to addresses stored in a switch control memory ACM. In FIG. 11A, the input data A, B, C, which has been sequentially written, is read out as two systems of C, A, B and B, A, C according to the addresses of the switch control memory ACM. In this operation, the same amount of data as the amount of the input data, which has been added to the input data, is operative as a blank region to prevent a blocking as mentioned before. The data including the blank region is not read out in serial as in the conventional technique, but is read out in parallel. Therefore, a bit rate of output data from the front time switch FTSW is identical to a bit rate of the input data.

Figure 11B:
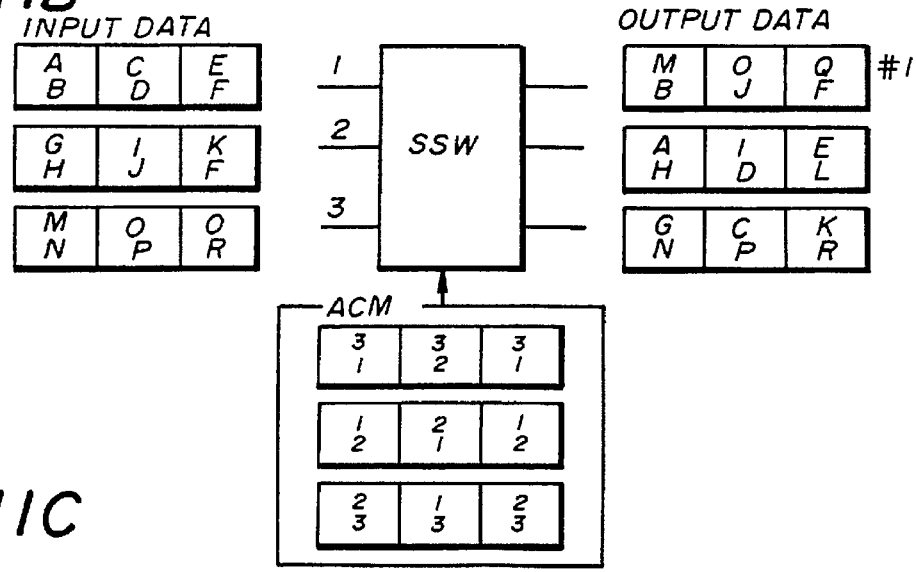

The 2-system input data per one channel, which has been read out from the front time switch, is supplied in parallel to the space switch SSW, as shown in FIG. 11B. In an example shown in FIG. 11B, the space switch processes three channels. The space switch SSW interchanges time slots of the three-channel input data across the channels according to addresses stored in a switch control memory ACM. Since the two-system data is applied in parallel for one channel, two-system addresses per one channel also are stored in the ACM. For example, in a channel #1, for the addresses of the switch control memory ACM, two-system addresses 3, 3, 3 and 1, 2, 1 are set. And, according to the address 3, 3, 3, output data M, O, Q is read out, and in parallel to the above reading, according to the address 1, 2, 1, output data B, J, F is read out. Also in other channels, in the same way mentioned above, two-system data is processed in parallel.

Figure 11C:
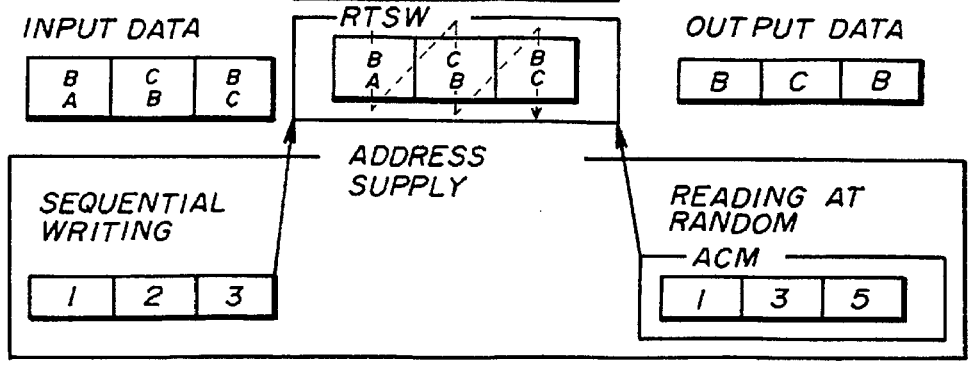

As shown in FIG. 11C, The output data read out from the space switch SSW is supplied as input data to the rear time switch RTSW. The input data is sequentially written into the rear time switch RTSW, and is read out at random according to addresses stored in a switch control memory ACM. In this reading operation, to remove the blank region, half of the data, which has been written into the rear time switch RTSW, is read out. The address stored in the switch control memory ACM of the RTSW is increased along a dotted line shown in FIG. 11C. In an example shown in FIG. 11C, the addresses are 1, 3, 5, and the data B, C, B is read out from the rear time switch RTSW.

Figure 12:
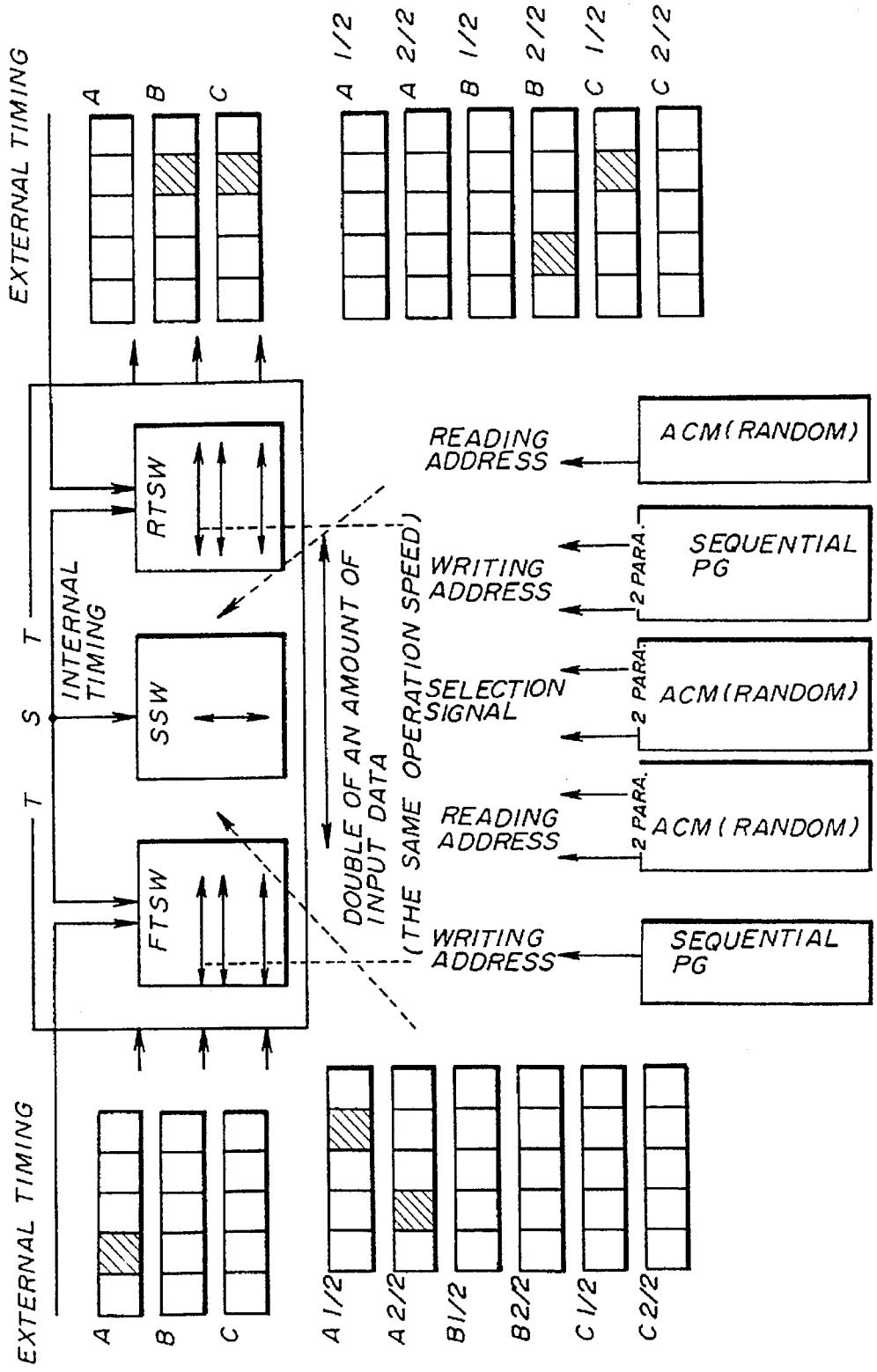
FIG. 12 shows a block diagram representing data flow of the first embodiment of the time-slot interchanger according to the present invention.

FIG. 12 shows a block diagram representing data flow of the first embodiment of the time-slot interchanger according to the present invention. FIG. 12 shows an example in which one time slot (shaded part) of a channel A is switched to different time-slot positions (shaded parts) of different channels B, C.

Reading of the data from the front time switch FTSW is carried out by reading in parallel the two-system addresses per one channel from the switch control memory ACM. For example, the data of the channel A is read out as two data sequences of a channel A 1/2 and a channel A 2/2. Therefore, the double of the amount of the input data, which includes the blank region, is read out. As mentioned before, such an operation may be achieved by using, for example, the two memories or the dual-read-out memory.

Selecting in the space switch SSW is carried out by reading in parallel two-system selection (SEL) signals per one channel from the switch control memory ACM. Further, the reading in the rear time switch RTSW is carried out by reading in parallel the two-system addresses per one channel from the switch control memory ACM.

In the above data processing, though the double of the amount of the input data needs to be processed since the blank region has been added to the input data, a bit rate of the data processed by each switch is identical to the bit rate of the input data. Therefore, the time-slot interchanger TSI according to the present invention may resolve the problems (1) and (2) in the conventional technology.

Furthermore, as shown in FIG. 12, an external timing from outside the time-slot interchanger TSI is independently applied to a front section of the front time switch FTSW and to a rear section of the rear time switch RTSW. And in these sections, the external timing and an internal timing are interchanged, which will be described in detail later. In a first timing change, the front time switch FTSW switches from an operation at the external timing to an operation at the internal timing, and in a second timing change, the rear time switch RTSW switches from the operation at the internal timing to the operation at the external timing. The space switch SSW operates at only the internal timing. Therefore, an internal circuit of the time-slot interchanger TSI may be constructed without taking the external timing into account. In this way, the time-slot interchanger TSI may resolve the problem (3) in the conventional technology.

Figure 1:
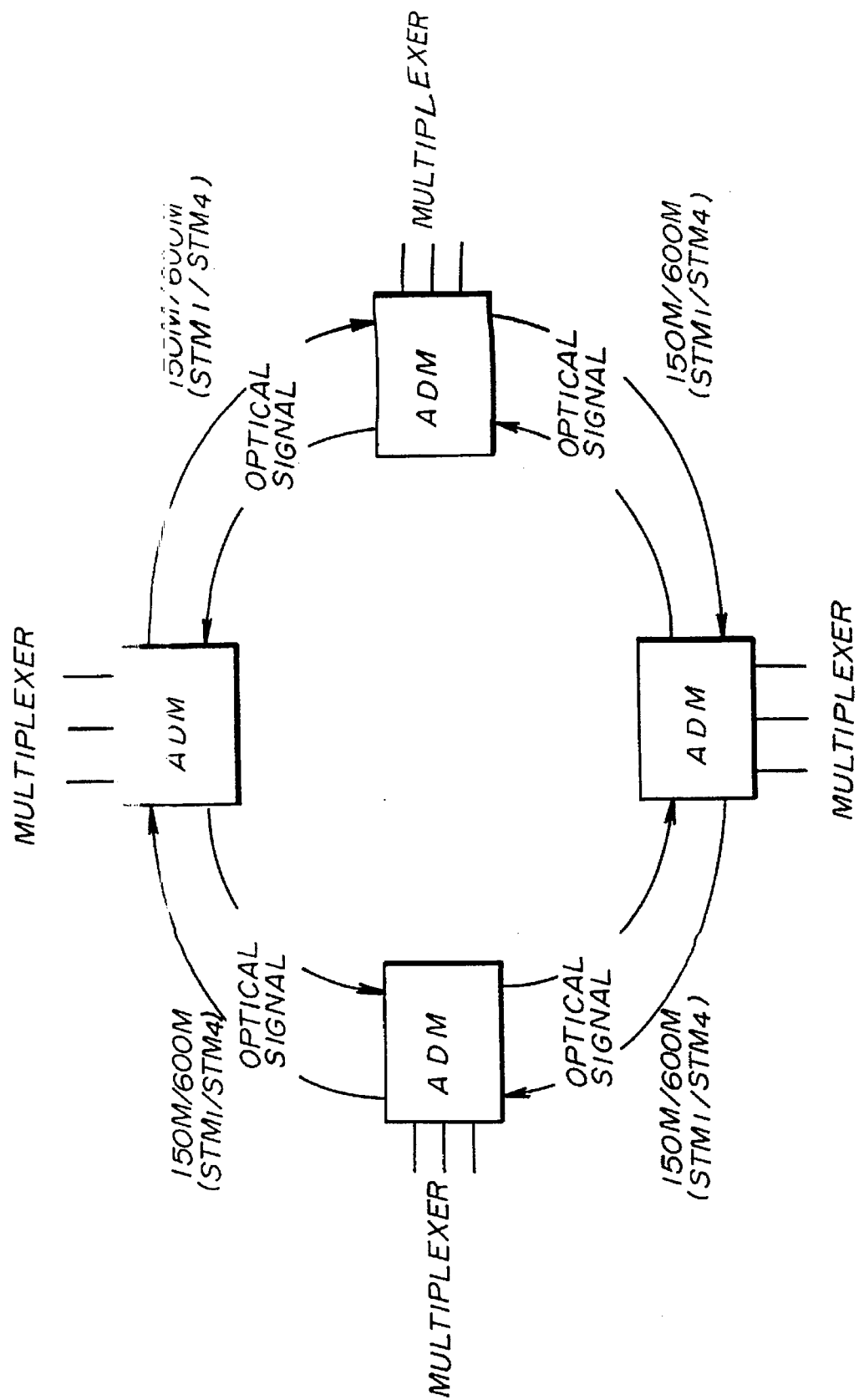
FIG. 1 shows an example of a network using a synchronous multiplexer.
Figure 2:
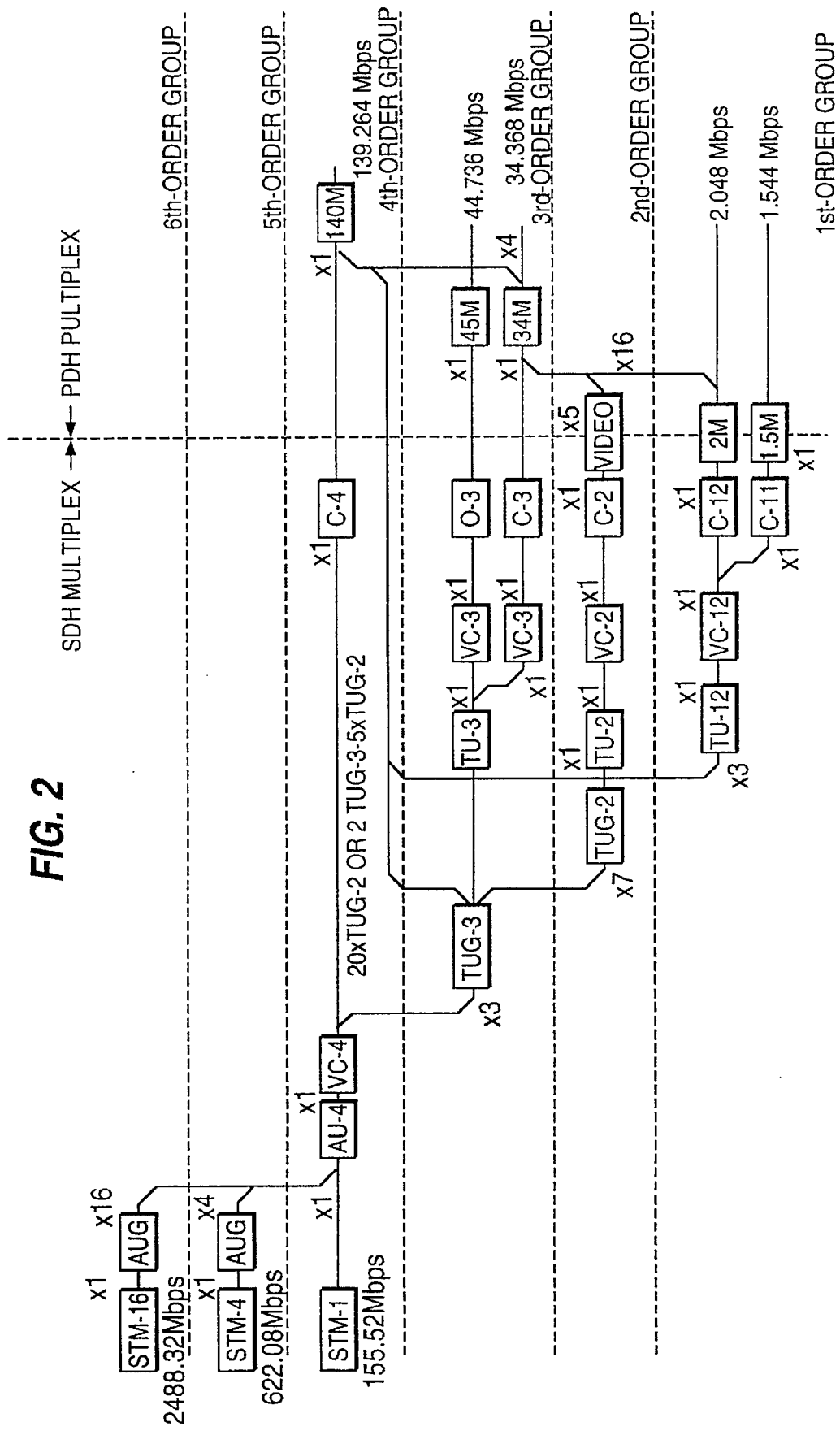
FIG. 2 shows an example of a digital hierarchy of a multiplexed signal in the network shown in FIG. 1.
Figure 3:
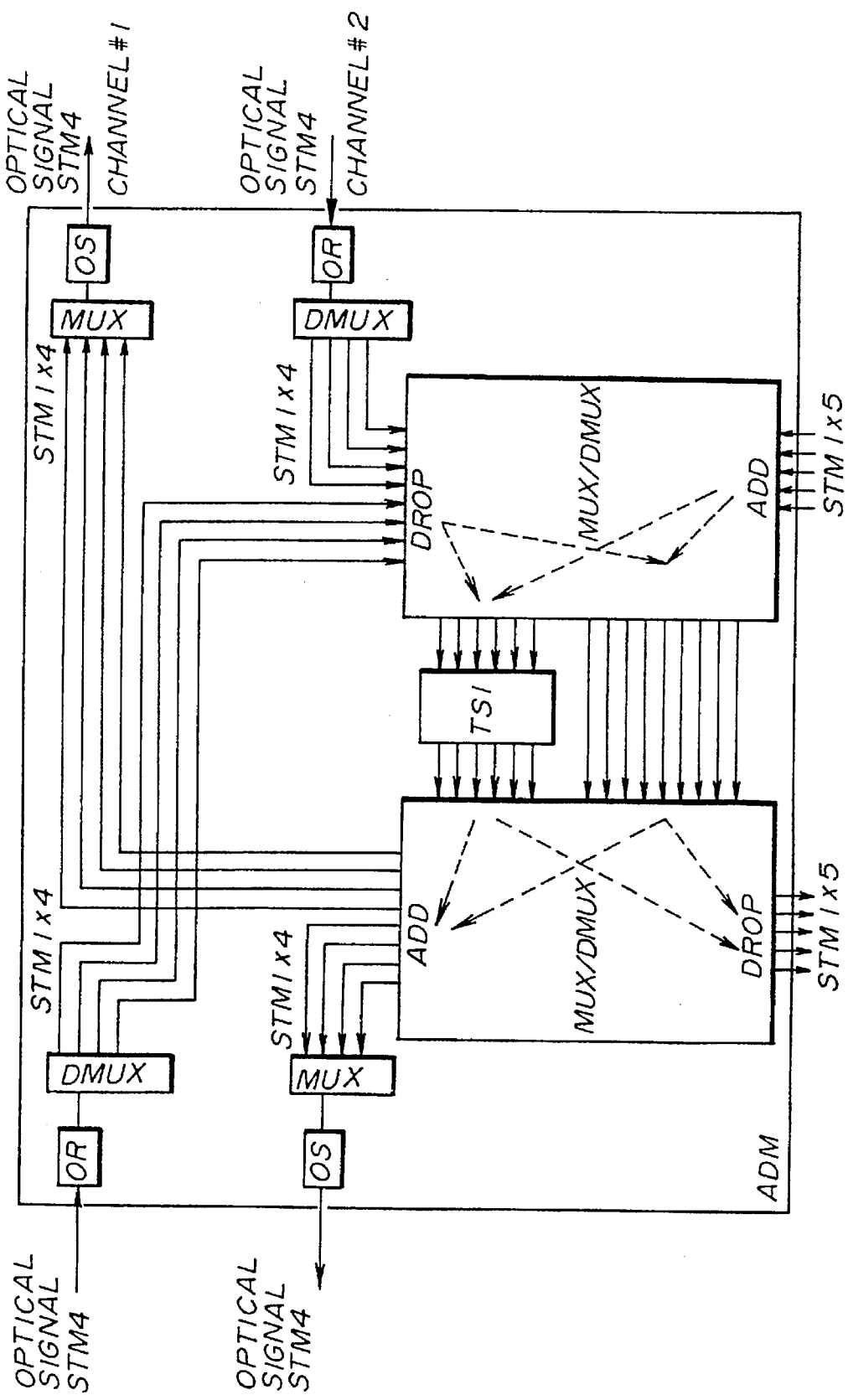
FIG. 3 shows a configuration of an ADM shown in FIG. 1.
Figure 4:
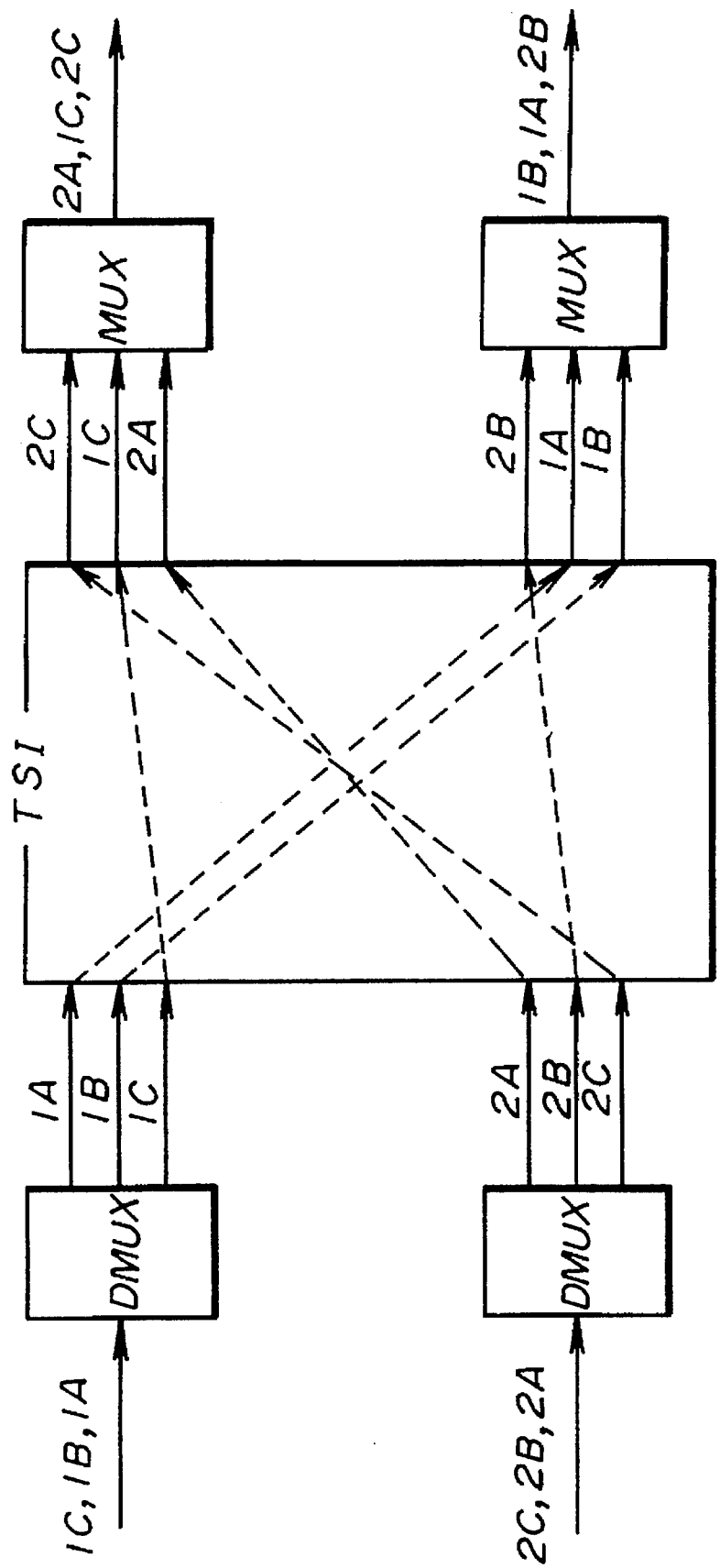
FIG. 4 shows an illustration representing a concept of a time-slot interchanger TSI.
Figure 5:
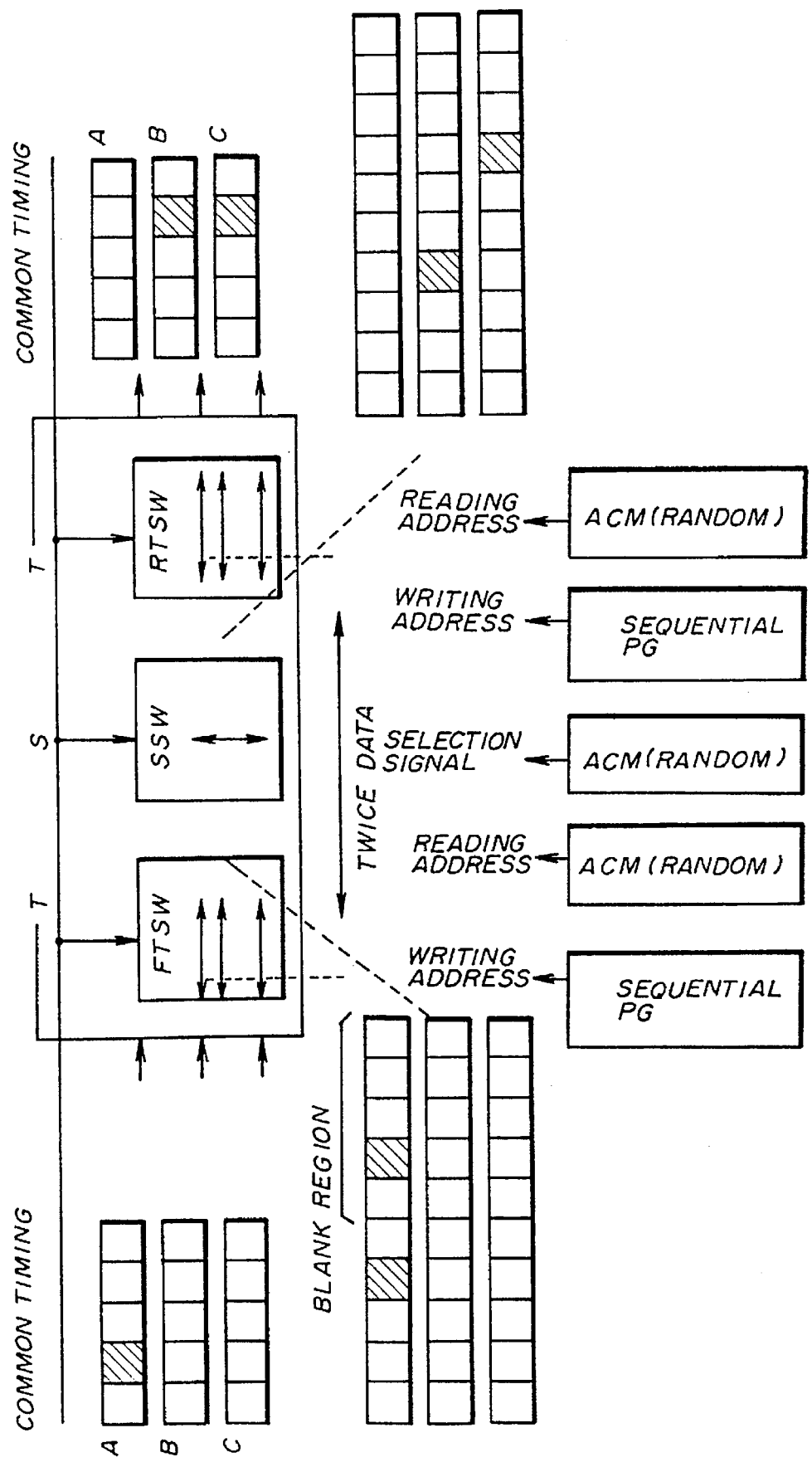
FIG. 5 shows an illustration representing data processing of a conventional time-slot interchanger TSI.
Figure 13:
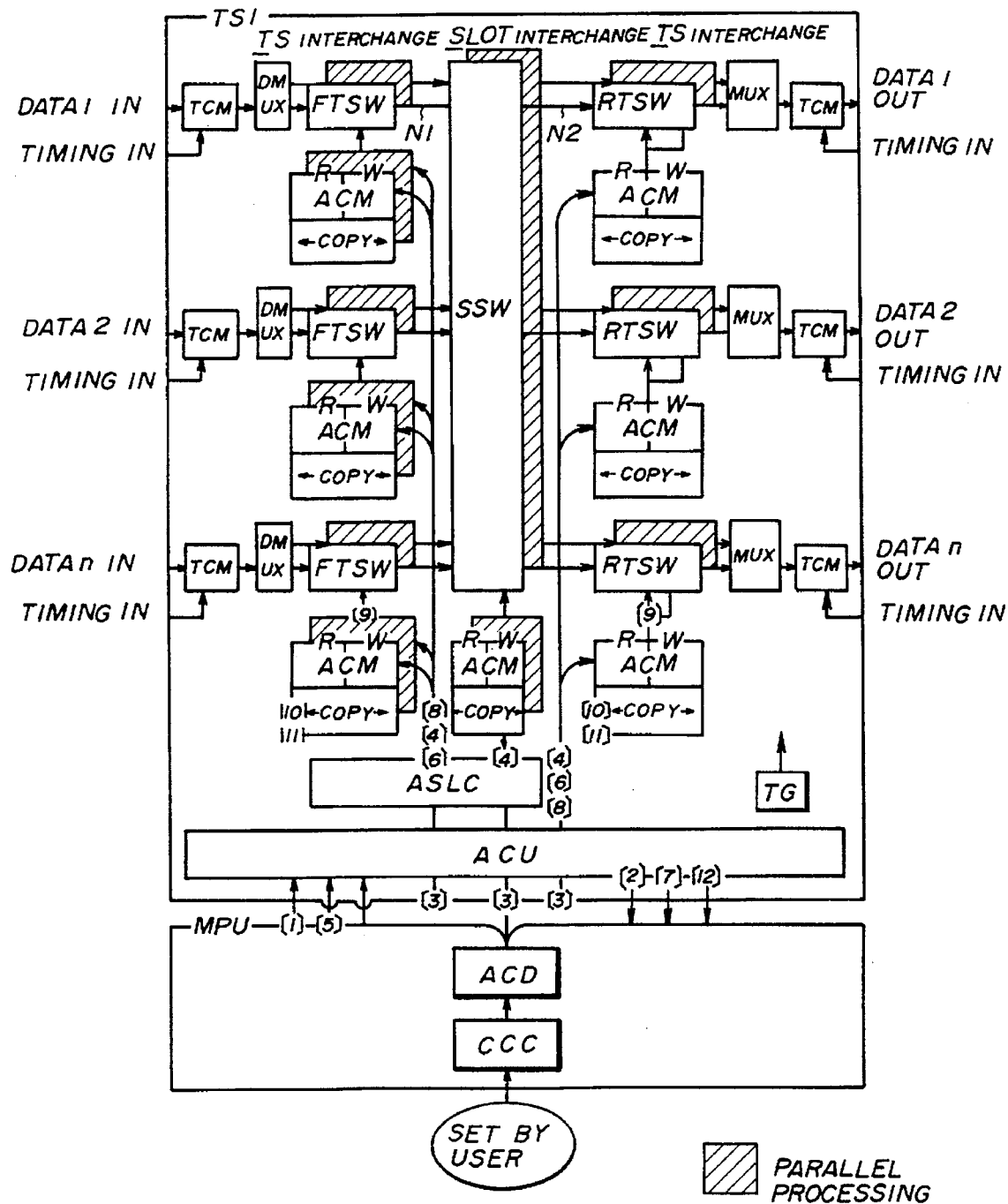
FIG. 13 shows a block diagram of the first embodiment of the time-slot interchanger according to the present invention.

FIG. 13 shows a block diagram of the first embodiment of the time-slot interchanger according to the present invention. A configuration shown in FIG. 13 is used in, for example, the networks shown in FIG. 1 and FIG. 3. The time-slot interchanger TSI shown in FIG. 13 has n channels. Each channel processes, for example, a 19-Mbps 8-bit parallel data signal. Each channel has two front time switches FTSWs and two rear time switches RTSWs for processing the data of the two systems in parallel. Two space switches SSWs are commonly used for all channels for the same purpose. In this drawing, one of the two switches is respectively shaded. Such a double switch construction (having two memories) makes it possible to process the data efficiently. An operation of each switch has been previously described by referring to FIGS. 11A to 11C and 12.

In each switch, the switch control memory ACM and a copy section (COPY) are installed. The switch control memory ACM and the copy section are also doubled for the double construction of the front time switch FTSW. The double switch control memories ACMs (white block and shaded block) respectively supply the addresses to the double front time switches FTSWs. One of the double switch control memories ACMs includes two memories, wherein when the one is used for reading, the other thereof may be used for writing, and vice versa. The copy section COPY copies the address data for the FTSW between the two memories in one of the double ACMs.

The switch control memories ACMs connected to the front time switches FTSWs and the switch control memories ACMs connected to the space switches SSWs are controlled by a commonly installed ACM-access-selection control unit ASLC. A single switch control memory ACM connected to the two rear time switches RTSWs is controlled by an access control unit ACU. The access control unit ACU also controls the ACM-access-selection control unit ASLC.

The time-slot interchanger TSI having the above construction is controlled by a microprocessor MPU. The microprocessor MPU comprises an address-control division unit ACD and a channel/column converter CCC. The front time switch FTSW, the rear time switch RTSW, and the space switch SSW are controlled by a common internal timing signal generated in a timing generator TG inside the time-slot interchanger TSI.

Further, in an input side (a front side) and an output side (a rear side) of each channel, a timing change circuit TCM is installed. The timing change circuit TCM installed in the input side receives a data signal and an external timing signal from outside, and converts the received data signal to a data signal in synchronization with the internal timing signal generated in the timing generator TG. The timing change circuit TCM installed in the output side receives the data signal in synchronization with the internal timing signal, converts the received data signal to a data signal in synchronization with the external timing signal and outputs it. An operation of the timing change circuit TCM will be described in detail later.

The input data signal produced from the input-side timing change circuit TCM is separated in a demultiplexer DMUX, and is respectively supplied to the doubled front time switches FTSWs. The output data signals produced from the doubled rear time switches RTSWs are multiplexed to a single multiplexed output signal in a multiplexer MUX, the output data being supplied to the output-side timing change circuit TCM.

Figure 14:
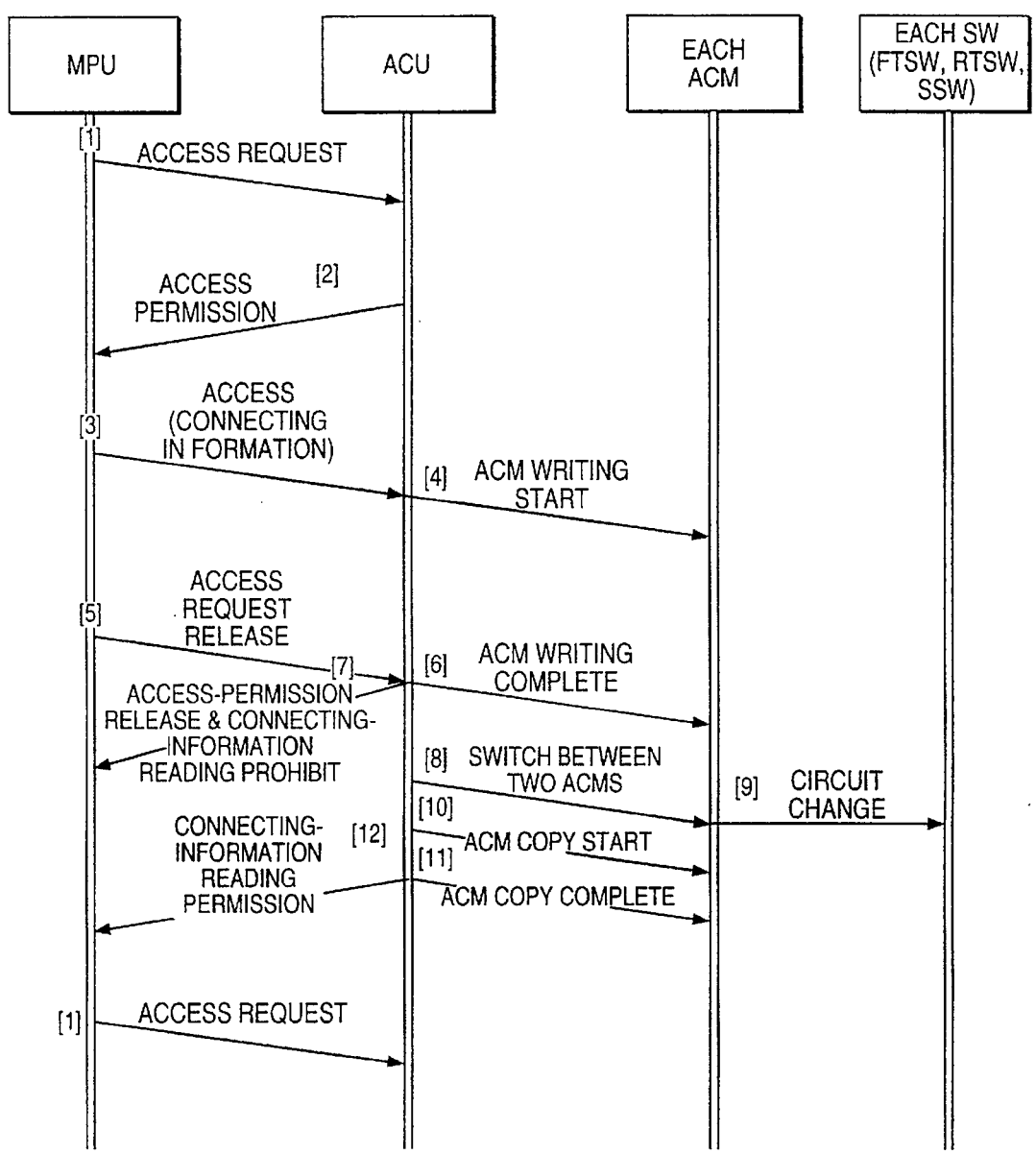
FIG. 14 shows sequences of circuit cross connecting and circuit changing in the time-slot interchanger TSI.
Figure 15:
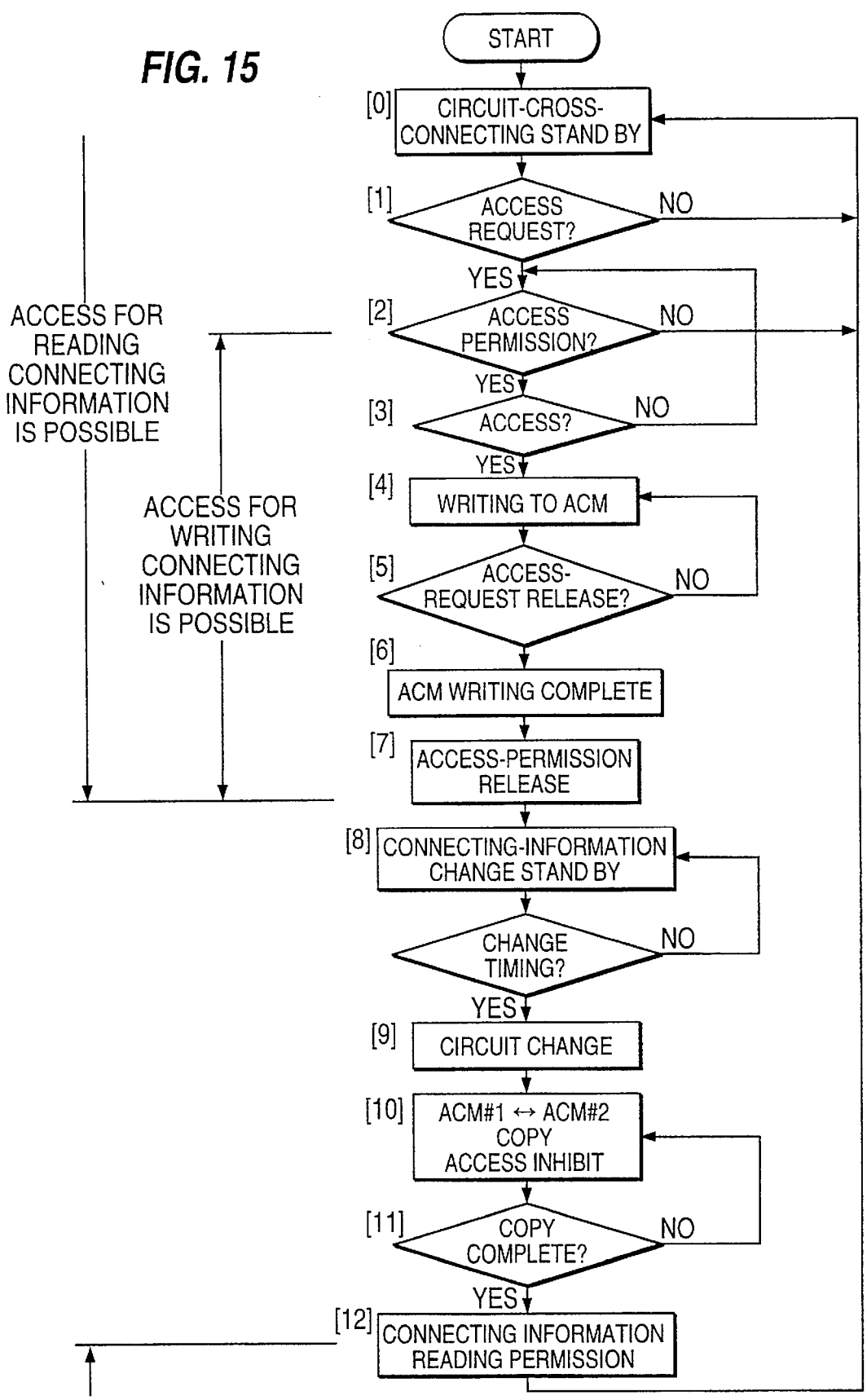
FIG. 15 shows an operation flowchart of an access control unit ACU of the time-slot interchanger TSI.

Next, a description will be given of an operation of the time-slot interchanger TSI shown in FIG. 13, by referring to FIGS. 14 and 15. FIG. 14 shows sequences of circuit cross connecting and circuit changing in the time-slot interchanger TSI. FIG. 15 shows an operation flowchart of the access control unit ACU of the time-slot interchanger TSI.

First, the information sent by the user is converted to the connection information of the byte unit by the channel/column converter CCC and the address-control division unit ACD. After the converting is finished, the MPU produces a circuit-access request signal to the access control unit ACU inside the time-slot interchanger TSI ([1]).

The access control unit ACU determines a timing of accessing for each switch control memory ACM, and transmits an access permission signal (a circuit-cross-connecting permission signal) back to the MPU ([2]). For the above determination, if it is out of a switching process time and a copy process time between the two memories in one of the double ACMs, the access control unit ACU gives an access permission to the MPU, as shown in FIG. 15. However, during the switching-process time and the copy-process time, the access permission is not given to the MPU. Then, the MPU acknowledges the access permission signal, and produces circuit-cross-connecting information to the access control unit ACU to access the circuit cross connecting ([3]).

The circuit-cross-connecting information is supplied to the ACM-access-selection control unit ASLC through the ACU, and is converted to a signal suitable for each switch control memory ACM there. For example, the addresses are divided into two groups (a number of the addresses is halved) to process the input data in parallel, and the switch control memory ACM to be accessed is selected. To the selected switch control memory ACM, the converted circuit-cross-connecting information is supplied, and the writing operation starts ([4]).

When the access for the circuit cross connecting in the step [3] and the writing in the step [4] are completed, the MPU produces an access-request release signal to the access control unit ACU ([5]). The access control unit ACU acknowledges the access-request release signal, and completes writing into one #1 of the two memories included in each of the double switch control memories ACMs ([6]), and further releases the access permission from the MPU ([7]). In the above situation, the one memory #1 of the two memories in the switch control memory ACM is selected for the new connecting information to be written into itself, and the other memory #2 of the two memories is selected for the previous connecting information to be read out from itself.

After that, based on an internal circuit changing timing, the one memory #1 of the two memories in the switch control memory ACM is switched to read out the new connecting information ([8]). In this way, the new connecting information is supplied to the switches, and the circuit is changed according to the new circuit-cross-connecting information ([9]). This change is performed each 1 ROW shown in the format of FIG. 7.

In this time, the other memory #2 of the two memories in the switch control memory ACM will be connected with the MPU to accept next connecting information. However, before being connected with the MPU, the new connecting information stored in the one memory #1 of the ACM is copied to the other memory #2 of the ACM, a content of which is also updated ([10]). When the copy is completed ([11]), the access control unit ACU reports, an access permission for reading the connecting information from the ACM, to the MPU ([12]).

Figure 16:
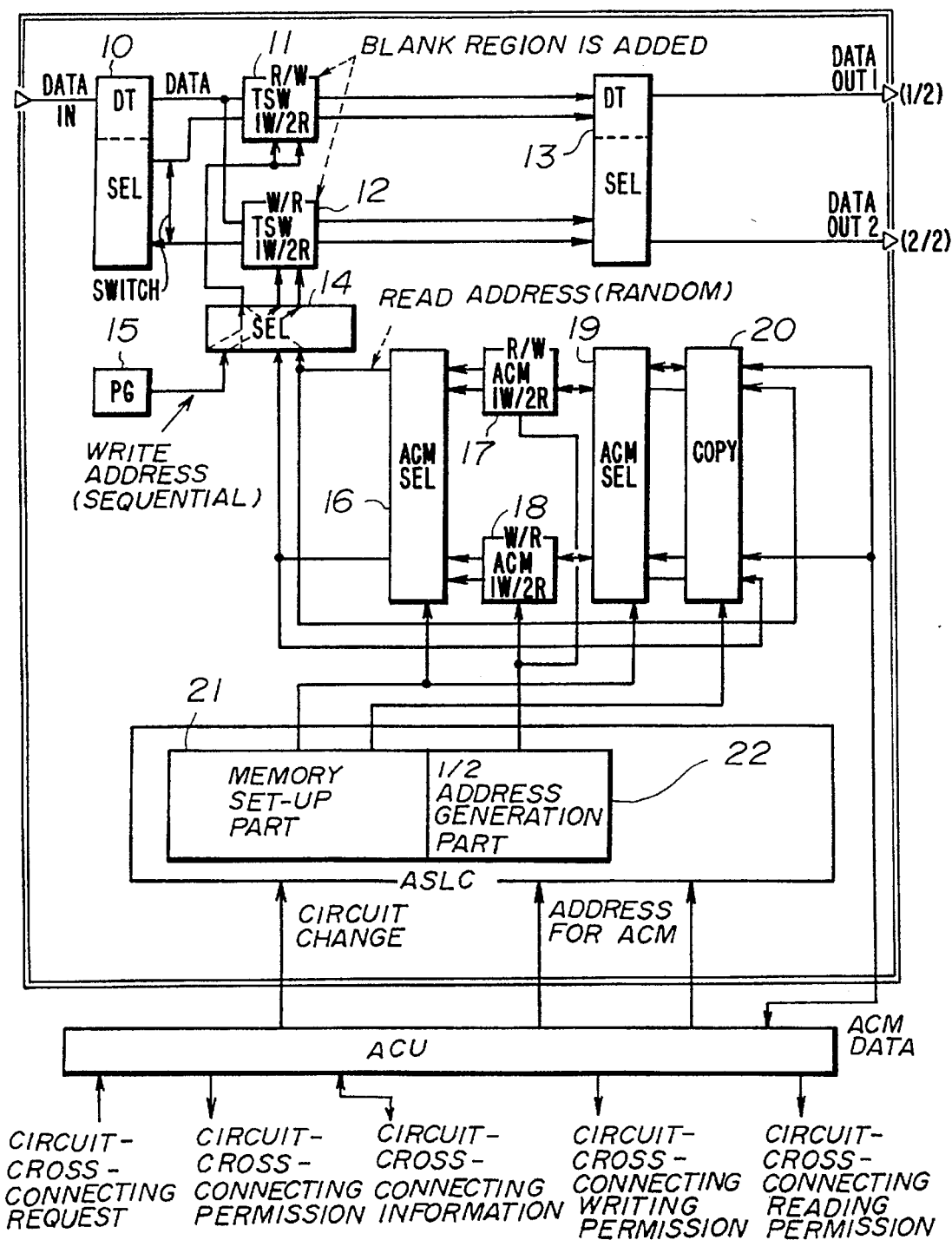
FIG. 16 shows a block diagram of a first configuration of a front time switch FTSW and peripheral circuits shown in FIG. 13.

FIG. 16 shows a block diagram of a first configuration of the front time switch FTSW and peripheral circuits shown in FIG. 13. The front time switch FTSW comprises a data detection/selection part (DT/SEL) 10, two memories constructing time switches (TSWs) 11, 12, a data detection/selection part (DT/SEL) 13, a selector (SEL) 14, a program counter (PG) 15, two ACM selection parts (ACMSELs) 16, 19, two switch control memories (ACMs) 17, 18, and a copy part (COPY) 20. Each of the memories 11, 12 corresponds to the double front time switches FTSWs (white block and shaded block) shown in FIG. 13. Components represented by numerals 14 to 19 correspond to the double switch control memories ACMs shown in FIG. 13, and the memories 17, 18 correspond to the two memories included in each of the double switch control memories ACMs shown in FIG. 13.

The data detection/selection part 10 shown in FIG. 16 corresponds to the demultiplexer DMUX shown in FIG. 13. Each of the memories 11, 12 has one write-into port and two read-out ports. Each of the switch control memories ACMs 17, 18 has one write-into port and two read-out ports. From each of these memories, two sets of data can be read out simultaneously by supplying two addresses.

The input data produced from the timing change circuit TCM is alternatively written into the memories 11, 12 each 1 ROW in the data detection/selection part 10. In each memory 11, 12, the data sequence in the 1 ROW is sequentially written according to addresses produced from the program counter 15 (refer to FIG. 11A). The selector 14 connects the program counter 15 to the memory 11 and the memory 12, alternatively, each 1 ROW. The data reading from the memories 11, 12 is also carried out alternatively, each 1 ROW. Therefore, in each memory 11, 12, the writing and the reading are alternatively performed each 1 ROW.

At this time, to prevent the blocking from generating, the double of the amount of the input data is respectively read out from the memories 11, 12. A half of the read-out data is the blank region. The addresses for reading out are given through the ACM selection part 16 and the selector 14.

The circuit-cross-connecting information is supplied to the access control unit ACU, from which the circuit-cross-connecting information is supplied to the ACM-access-selection control unit ASLC. A 1/2-address generation part 22 in the ASLC divides the addresses for the ACM in the circuit-cross-connection information into two addresses for the ACM (generates two addresses for the ACM from the one address data from the ACU). In response to the circuit-cross-connection information, a memory-set-up part 21 supplies a control signal to the copy part 20 and the ACM-selection parts 16, 19 to set the switch control memories ACMs 17, 18 as the read-out memory or the write-into memory. If the switch control memory ACM 17 is set as the read-out memory, the switch control memory ACM 18 is set as the write-into memory, and vice versa. This set-up operation is switched, for example, each circuit cross connecting.

First in the circuit cross connecting, the circuit-cross-connecting information is supplied to the access control unit ACU, from which ACM data (addresses for the memories 11, 12) is written to a set-up one as the write-into memory of the switch control memories ACMs 17, 18 through the copy part 20 and the ACM-selection part 19.

While, in the other one of the switch control memories ACMs 17, 18, the read-out operation is carried out. From this memory which is set up as the read-out memory, the two addresses shown in FIG. 11A are produced to read the double of the amount of the input data from each memory 11, 12 for the purpose of preventing the blocking from generating. The ACM-selection part 16 is also controlled by the memory-setup part 21, and the two addresses produced from the read-out memory are supplied to the selector 14 and the copy part 20.

The selector 14 produces the received two addresses to the memories 11, 12, alternatively each 1 ROW. From each of the memories 11, 12, according to the two addresses, the double of the amount of the input data, which includes the blank region, is read out. Namely, each memory 11, 12 produces two-system data, in each of which the time slots are interchanged as shown in FIG. 11A.

The data detection/selection part 13 alternatively receives the two-system data from the memories 11, 12 each 1 ROW, and distributes each two-system data into data for OUT1 and data for OUT2 to supply them to the space switches SSWs shown in FIG. 13.

In the case of performing the copy operation previously mentioned by referring to the steps [10] and [11] shown in FIGS. 14, 15, since the addresses, which have been read out from the one of the memories 17, 18, are supplied to the copy part 20 as well as the selector 14 through the ACM-selection part 16, the copy part 20 selects the addresses from the ACM-selection part 16 instead of the ACM data from the switch control unit ACU. Thus, the addresses read out are written into the other one of the memories 17, 18 through the ACM-selection part 19.

Figure 17:
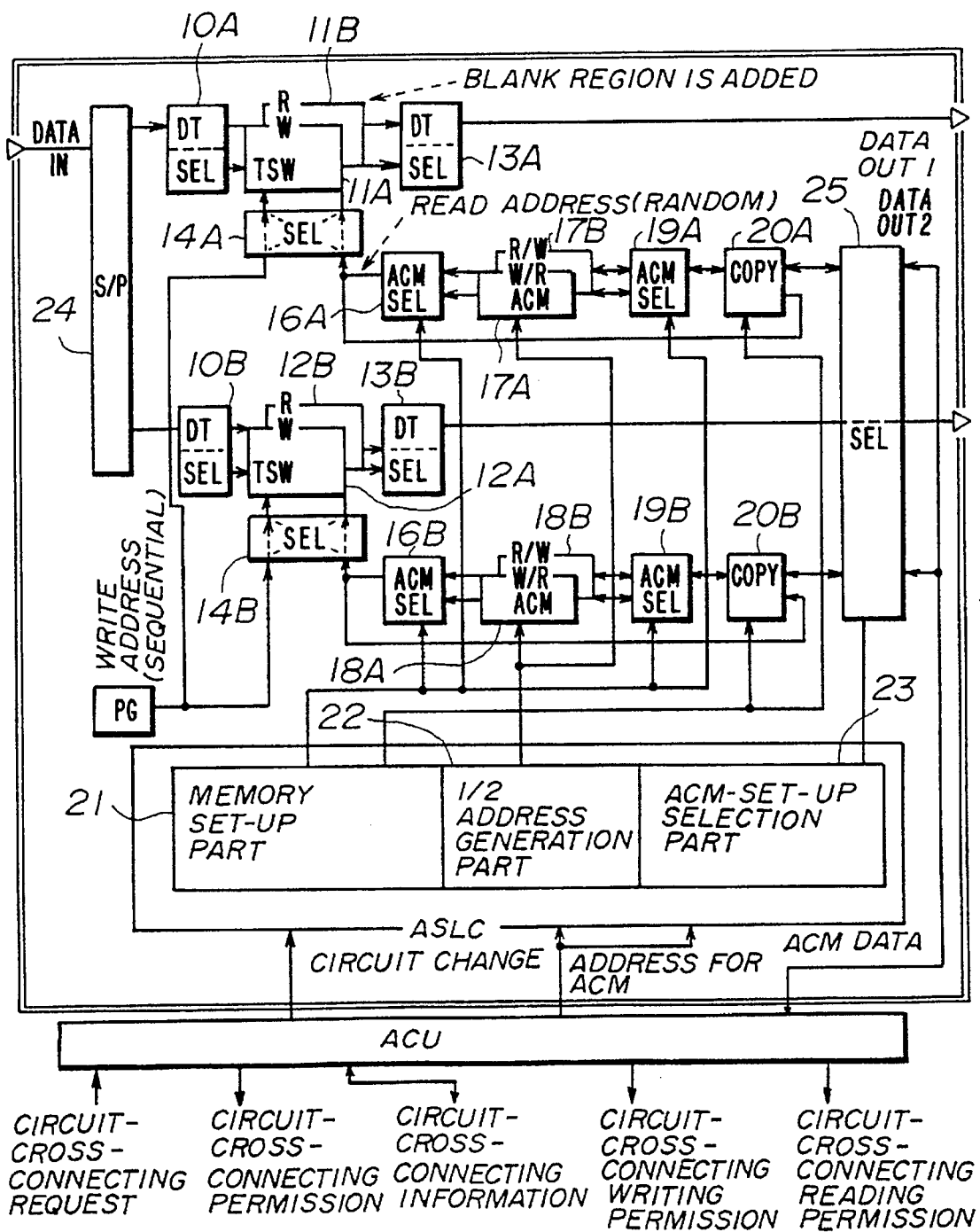
FIG. 17 shows a block diagram of a second configuration of the front time switch FTSW and the peripheral circuits shown in FIG. 13.

FIG. 17 shows a block diagram of a second configuration of the front time switch FTSW and the peripheral circuits shown in FIG. 13. For each memory shown in FIG. 17, a memory having one write-into port and one read-out port is applied. This memory produces only one sets of data for a supplied address. On the contrary, the memory shown in FIG. 16 can produce the two set of data simultaneously for the supplied address.

Memories 11A and 12A correspond to the memory 11 shown in FIG. 16, and memories 11B and 12B correspond to the memory 12 shown in FIG. 16. And memories 17A and 18A correspond to the memory 17 shown in FIG. 16, and memories 17B and 18B correspond to the memory 18 shown in FIG. 16. Since each of these memories has only the one write-into port and the one read-out port, each of their peripheral circuits is also separated into two circuits. For example, the data detection/selection part 10 shown in FIG. 16 is separated into data detection/selection parts 10A and 10B in FIG. 17, and the data detection/selection part 13 shown in FIG. 16 is separated into data detection/selection parts 13A and 13B in FIG. 17. In the same way, the components 14, 16, 19, 20 are respectively separated to 14A and 14B, 16A and 16B, 19A and 19B, 20A and 20B.

Since the 1-port-write/1-port-read memory is used, a serial-to-parallel converter (S/P) 24, a selector 25, and an ACM-set-up-selection part 23 in the ASLC are installed. In the serial-to-parallel converter (S/P) 24, the input data signal is converted to a parallel signal, which is respectively supplied to the data detection/selection parts 10A, 10B. The ACM-set-up-selection part 23 determines which of two systems of the switch selection memories 17A, 17B and 18A, 18B has to be selected, and controls the selector 25. Other operations of circuits shown in FIG. 17 are almost the same as that of the circuits shown in FIG. 16.

Figure 18:
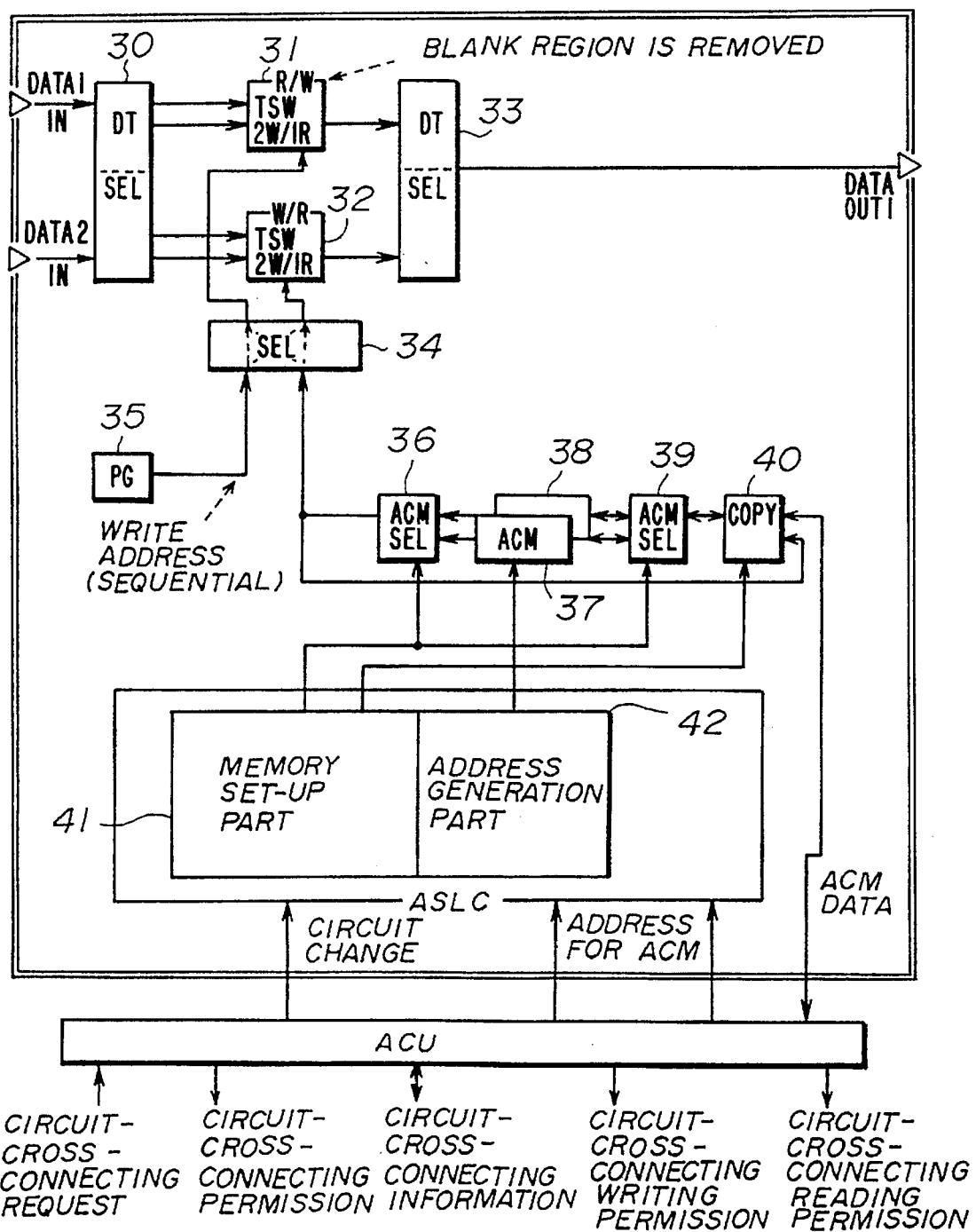
FIG. 18 shows a block diagram of a first configuration of a rear time switch RTSW and peripheral circuits shown in FIG. 13.

FIG. 18 shows a block diagram of a first configuration of the rear time switch RTSW and peripheral circuits shown in FIG. 13. The rear time switch RTSW comprises a data detection/selection part (DT/SEL) 30, two memories constructing time switches (TSWs) 31, 32, a data detection/selection part (DT/SEL) 33, a selector (SEL) 34, a program counter (PG) 35, two ACM selection parts (ACMSELs) 36, 39, two switch control memories (ACMs) 37, 38, and a copy part (COPY) 40. Each of the memories 31, 32 corresponds to the double rear time switches RTSWs (white block and shaded block) shown in FIG. 13. And components represented by numerals 34 to 39 correspond to the switch control memory ACM shown in FIG. 13, and the memories 37, 38 correspond to the two memories included in the switch control memory ACM shown in FIG. 13. If one of the memories 37, 38 is used for reading, the other thereof is used for writing.

The data detection/selection part 33 shown in FIG. 18 corresponds to the multiplexer MUX shown in FIG. 13. Each of the memories 31, 32 has two write-into ports and one read-out port. Each of the switch control memories ACMs 37, 38 has one write-into port and one read-out port. To each of the memories 31, 32, the two-system data can be simultaneously written.

The two parallel data signals IN1 and IN2 produced from the space switch SSW shown in FIG. 13 is alternatively written into the memories 31, 32 each 1 ROW in the data detection/selection part 30. In each memory 31, 32, the data signal in the 1 ROW is sequentially written according to addresses produced from the program counter 35 (refer to FIG. 11C). The selector 34 connects the program counter 35 to the memory 31 and the memory 32, alternatively, each 1 ROW. The data reading from the memories 31, 32 is also carried out alternatively, each 1 ROW. Therefore, in each memory 31, 32, the writing and the reading are alternatively performed each 1 ROW.

In this time, to remove the blank region which has been added to the data to prevent the blocking from generating, the same amount of the input data is respectively read out from the memories 31, 32. The random addresses for reading out are given from the ACMs 37, 38 through the ACM selection part 36 and the selector 34.

The previously mentioned circuit-cross-connecting information is supplied to the access control unit ACU, from which the circuit-cross-connecting information is supplied to the ACM-access-selection control unit ASLC. An address generation part 42 in the ASLC generates the addresses for the ACMs 37, 38 based on the circuit-cross-connection information. And in response to the circuit-cross-connection information, a memory-set-up part 41 produces a control signal to the copy part 40 and the ACM-selection parts 36, 39 to set the switch control memories ACMs 37, 38 as the read-out memory or the write-into memory. If the switch control memory ACM 37 is set as the read-out memory, the switch control memory ACM 38 is set as the write-into memory, and vice versa. This set up operation is switched, for example, each circuit cross connecting.

First in the circuit cross connecting, the circuit-cross-connecting information is supplied to the access control unit ACU, from which ACM data (addresses for the memories 31, 32) is written to a set-up one as the write-into memory of the switch control memories ACMs 37, 38 through the copy part 40 and the ACM-selection part 39.

While, in the other one of the switch control memories ACMs 37, 38, the read-out operation is carried out. From this memory which is set up as the read-out memory, the addresses for the memories 31, 32 shown in FIG. 11C are produced. The ACM-selection part 16 is also controlled by the memory-set-up part 21, and the addresses produced from the read-out memory are supplied to the selector 14 and the copy part 20.

The selector 14 produces the received addresses to the memories 31, 32, alternatively each 1 ROW. From each of the memories 31, 32, according to the addresses, the same amount of the input data is read out after removing the blank region. Namely, each memory 31, 32 produces one-system data, in which the time slots are interchanged as shown in FIG. 11C.

The data detection/selection part 43 alternatively receives the two sets of data from the memories 31, 32 each 1 ROW, and unifies the two sets of data into data OUT1.

In the case of performing the copy operation previously mentioned by referring to the steps [10] and [11] shown in FIGS. 14, 15, since the addresses, which have been read out from the one of the memories 37, 38, are supplied to the copy part 40 as well as the selector 34 through the ACM-selection part 36, the copy part 40 selects the addresses from the ACM-selection part 36 instead of the ACM data from the switch control unit ACU. Thus, the addresses which have been read out from the one of the memories 37, 38 are written into the other of the memories 37, 38 through the ACM-selection part 39.

Figure 19:
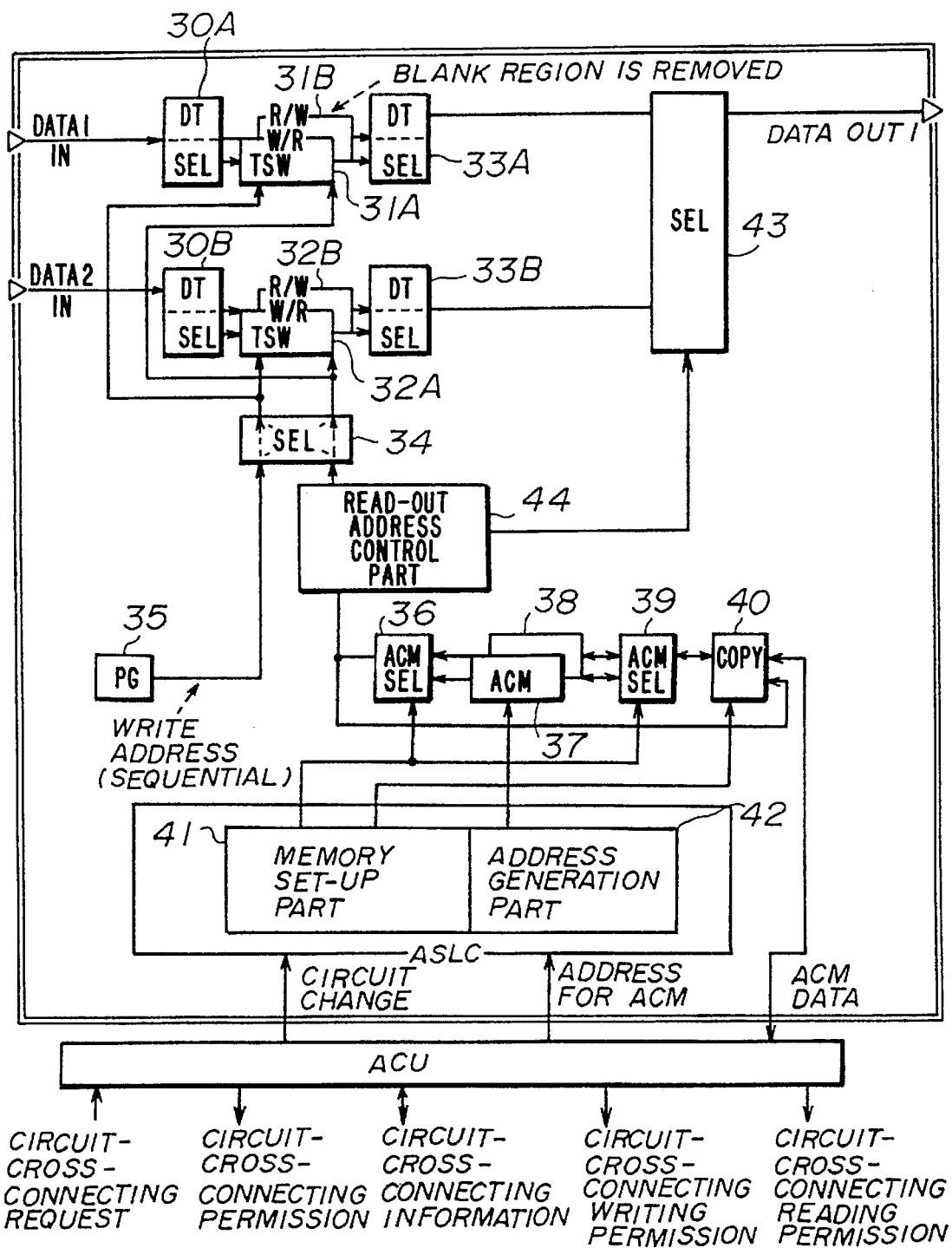
FIG. 19 shows a block diagram of a second configuration of the rear time switch RTSW and the peripheral circuits shown in FIG. 13.

FIG. 19 shows a block diagram of a second configuration of the rear time switch RTSW and the peripheral circuits shown in FIG. 13. For each memory shown in FIG. 19, the memory having one write-into port and one read-out port is applied. To this memory, only one set of data can be written at a certain time. On the contrary, to the memory shown in FIG. 18, two sets of data can be written simultaneously.

Memories 31A and 32A correspond to the memory 31 shown in FIG. 18, and memories 31B and 32B correspond to the memory 32 shown in FIG. 18. And the data detection/selection part 30 in FIG. 18 is separated into data detection/selection parts 30A and 30B in FIG. 19, and the data detection/selection part 33 shown in FIG. 18 is separated into data detection/selection parts 33A and 33B in FIG. 19.

Since the 1-port-write/1-port-read memory is used, a selector 43 and a read-out-address control part 44 are installed. The read-out-address control part 44 determines which of the data detection/selection parts 33A, 33B has to be selected based on the addresses from the ACM selection part 36, and supplies a control signal to the selector 43. The control signal may be produced based on, for example, a least significant bit (LSB) of the address. For example, in the case of the addresses (1, 3, 5) shown in FIG. 1C, the read-out-address control part 44 controls the selector 43 to select the data detection/selection part 33A (for example, LSB=0).

The addresses from the ACM selection part 36 is directly supplied to the memories 31A, 31B, 32A, 32B through the selector 34. When the memories 31A, 32A operate to read, the memories 31B, 32B operate to write, and vice versa. Other operations of the circuits shown in FIG. 19 are almost the same as that of the circuits shown in FIG. 18.

Figure 20:
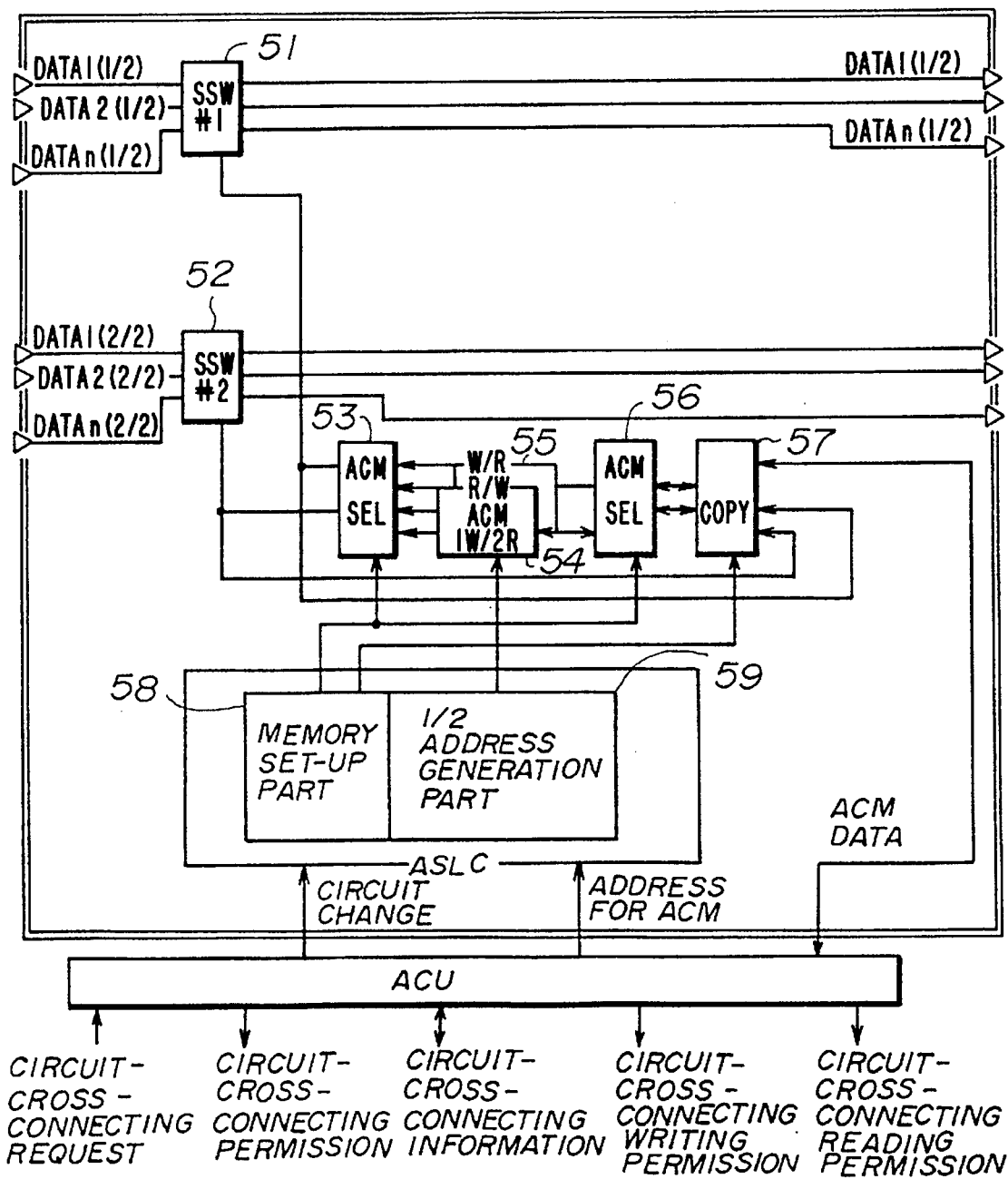
FIG. 20 shows a block diagram of a first configuration of a space switch SSW and peripheral circuits shown in FIG. 13.

FIG. 20 shows a block diagram of a first configuration of the space switch SSW and peripheral circuits shown in FIG. 13. The space switch SSW comprises two memories constructing space switches (SSW#1, SSW#2) 51, 52, two ACM selection parts (ACMSELs) 53, 56, two switch control memories (ACMs) 54, 55, and a copy part (COPY) 57. The memory 51 corresponds to one space switch of the double space switch SSW (for example, white block) shown in FIG. 13, and the memory 52 corresponds to the other space switch of the double space switch SSW (for example, shaded block) shown in FIG. 13. And components represented by numerals 53 to 56 correspond to the double switch control memories ACMs shown in FIG. 13, and the memories 54, 55 correspond to the two memories included in each of the double switch control memories ACMs shown in FIG. 13.

Each of the memories 51, 52 has one write-into port and one read-out port. Each of the switch control memories ACMs 54, 55 has one write-into port and two read-out ports. From each memory 54, 55, two sets of data can be read out simultaneously by supplying two addresses.

The data OUT1 of the two sets of data produced from each of n channels shown in FIGS. 16, 17 is supplied to the memory 51, and the data OUT2 of the two data is supplied to the memory 52.

The circuit-cross-connecting information is supplied to the access control unit ACU, from which the circuit-cross-connecting information is supplied to the ACM-access-selection control unit ASLC. A 1/2-address generation part 59 in the ASLC divides the addresses for the ACM in the circuit-cross-connection information into two addresses for the ACM (generates two addresses for the ACM from the one address data from the ACU). In response to the circuit-cross-connection information, a memory-set-up part 58 supplies a control signal to the copy part 57 and the ACM-selection parts 53, 56 to set the switch control memories ACMs 54, 55 as the read-out memory or the write-into memory. If the switch control memory ACM 54 is set as the read-out memory, the switch control memory ACM 55 is set as the write-into memory, and vice versa. This set up operation is switched, for example, each circuit cross connecting.

First in the circuit cross connecting, the circuit-cross-connecting information is supplied to the access control unit ACU, from which ACM data (addresses for the memories 51, 52) is written to a set-up one as the write-into memory of the switch control memories ACMs 54, 55 through the copy part 57 and the ACM-selection part 56.

While, in the other one of the switch control memories ACMs 54, 55, the read-out operation is carried out. From this memory which is set up as the read-out memory, the two addresses shown in FIG. 11B are produced. The ACM-selection part 53 is also controlled by the memory-set-up part 58, and the two addresses produced from the read-out memory are supplied to the memories 51, 52 and the copy part 57.

From these memories 51, 52, according to the two addresses, the double of the amount of the input data, which includes the blank region, is read out. Namely, the memories 51, 52 produce the two-system data, in which the time slots are interchanged with time slots of the other channel as shown in FIG. 11B. The n data read out from each of the memories 51, 52 is respectively supplied to the rear time switch RTSW.

In the case of performing the copy operation previously mentioned by referring to the steps [10] and [11] shown in FIGS. 14, 15, since the addresses, which have been read out from the one of the memories 54, 55, are supplied to the copy part 57 as well as the memories 51, 52 through the ACM-selection part 53, the copy part 57 selects the addresses from the ACM-selection part 53 instead of the ACM data from the switch control unit ACU. Thus, the addresses read out are written into the other one of the memories 54, 55 through the ACM-selection part 56.

Figure 21:
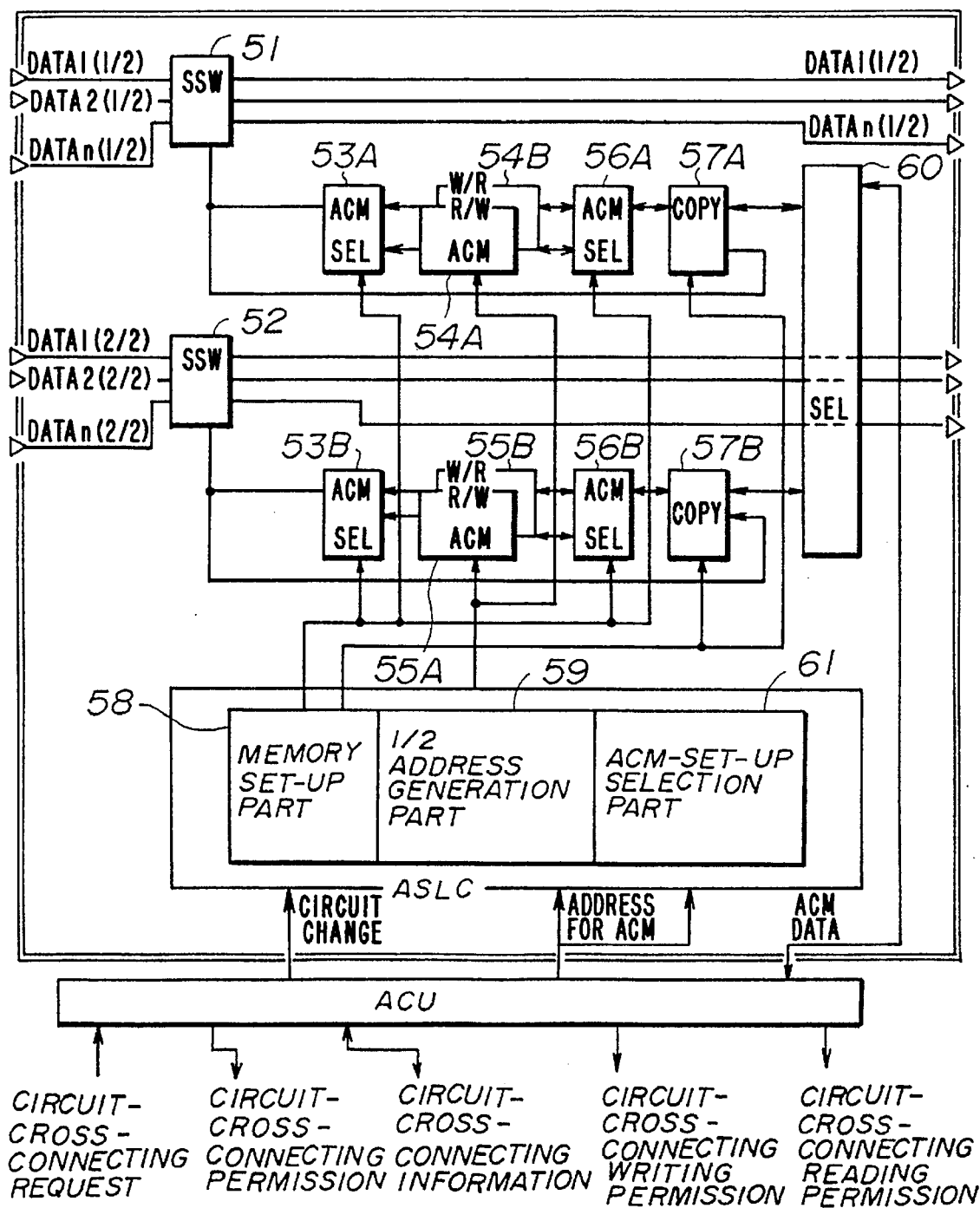
FIG. 21 shows a block diagram of a second configuration of the space switch SSW and the peripheral circuits shown in FIG. 13.

FIG. 21 shows a block diagram of a second configuration of the space switch SSW and the peripheral circuits shown in FIG. 13. For each memory shown in FIG. 21, the memory having one write-into port and one read-out port is applied. This memory produces only one set of data for a supplied address. On the contrary, the memories 54, 55 shown in FIG. 20 can produce the two sets of data simultaneously for the supplied address.

Memories 54A and 55A correspond to the memory 54 shown in FIG. 20, and memories 54B and 55B correspond to the memory 55 shown in FIG. 20. Since each of these memories has only the one write-into port and the one read-out port, each of their peripheral circuits is also separated into two circuits. For example, the components 53, 56, 57 are respectively separated to 53A and 53B, 56A and 56B, 57A and 57B.

Since the 1-port-write/1-port-read memory is used, a selector 60 is installed, and an ACM-set-up-selection part 61 is installed in the ASLC. The ACM-set-up-selection part 61 determines which of two systems of the switch selection memories 54A, 54B and 55A, 55B have to be selected, and controls the selector 60. Other operations of circuits shown in FIG. 21 are almost the same as that of the circuits shown in FIG. 20.

As mentioned above, the description has been given of the first embodiment according to the present invention except for the timing change circuit TCM shown in FIG. 13.

According to the first embodiment, though the double of the amount of the input data, which includes the blank region, is processed, each switch may operate at the same timing speed as the bit rate of the input data. Therefore, this first embodiment according to the present invention may resolve the problem (1) existed in the prior art. This embodiment may also resolve the problem (2) existing in the prior art, next, as will be described next by referring to FIGS. 22A and 22B.

Figure 22A:
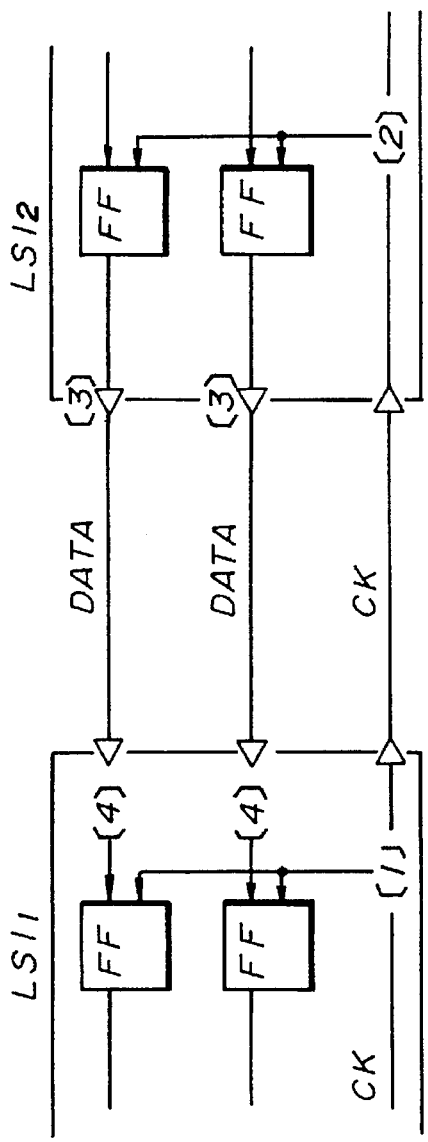
FIGS. 22A and 22B show illustrations for explaining a feature in the time-slot interchanger according to the present invention.
Figure 22B:
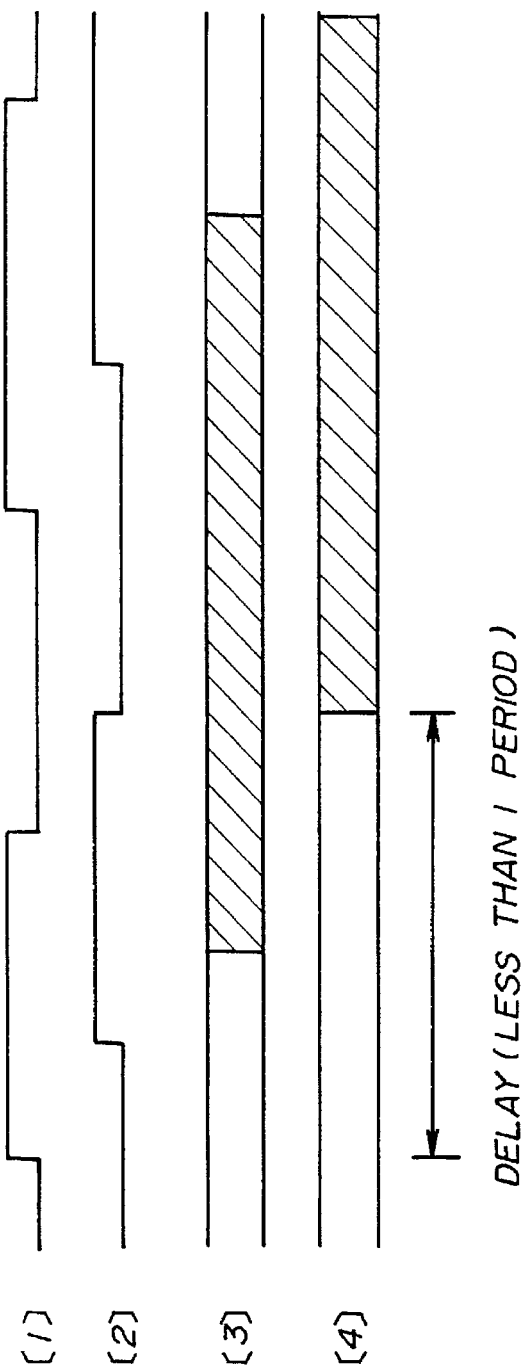

FIGS. 22A and 22B show illustrations for explaining a feature in the device according to the present invention. FIG. 22A shows one case that an LSI2 transmits parallel data to an LSI1 in response to a clock signal CK from the LSI1. FIG. 22B shows time charts of signals at points [1] to [4] shown in FIG. 22A.

In this case, as shown in FIG. 22B, a frequency of the clock signal CK [1], [2] is half of the frequency of the clock signal shown in FIG. 10B. Therefore, the LSI1 and the LSI2 (for example, the front time switch FTSW and the space switch SSW) operate at a half of the operation speed shown in FIG. 10B. Namely, a period of the operation timing of the LSI1, LSI2 shown in FIG. 22A is twice the period of the operation timing of the LSI1, LSI2 shown in FIG. 10A.

Though there is the same delay time as that shown in FIG. 10B in a transmission line for the clock signal CK and the data signal, in this device the delay time is within one period of the operation timing as shown in the time chart [4]. Therefore, a bit-by-bit synchronization between the LSI1 and the LSI2 may be maintained, and the above may resolve the problem (2) existing in the prior art.

Figure 23:
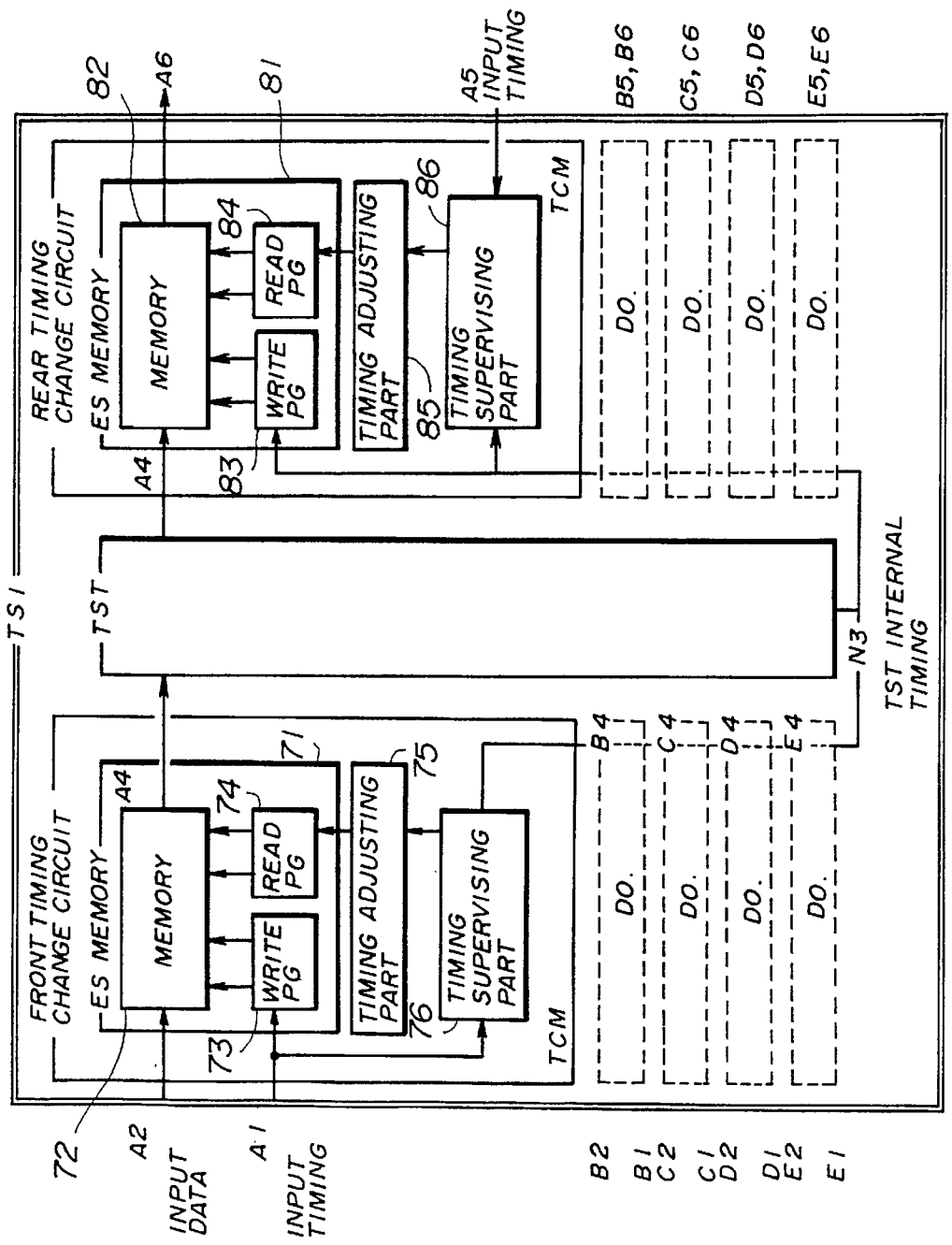
FIG. 23 shows a block diagram of front and rear timing change circuits TCMs in the first embodiment of the time-slot interchanger TSI according to the present invention.

Next, a description will be given of the timing change circuit TCM, by referring to FIG. 23. FIG. 23 shows a block diagram of front and rear timing change circuits TCMs in the first embodiment of the time-slot interchanger TSI according to the present invention. In FIG. 23, an example of the time-slot interchanger TSI having five channels A to E is represented. The TST (time/space/time) includes the devices from the demultiplexer DMUX to the multiplexer MUX shown in FIG. 13.

As shown in FIG. 23, the front and rear timing change circuits TCMs have the same configuration. The front timing change circuit TCM comprises an elastic (ES) memory 71, a timing adjusting part 75, and a timing supervising part 76. The elastic memory 71 comprises a memory 72, a write address program counter 73 for generating a write address for the memory 72, and a read address program counter 74 for generating a read address for the memory 72. In the same way, the rear timing change circuit TCM comprises an elastic (ES) memory 81, a timing adjusting part 85, and a timing supervising part 86. The elastic memory 81 comprises a memory 82, a write address program counter 83 for generating a write address for the memory 82, and a read address program counter 84 for generating a read address for the memory 82.

In the channel A, the front timing change circuit TCM receives a timing signal A1 and input data A2. The timing supervising part 76 detects a phase difference between the timing signal A1 and a TST internal timing signal N3 generated in the time generator TG shown in FIG. 13, and produces a timing adjusting signal according to the phase difference to the timing adjusting part 75.

The timing adjusting part 75 controls the read address program counter 74 according to the phase difference. For example, when the input timing signal A1 proceeds by ten bits from the TST internal timing signal N3, the timing adjusting part 75 adjusts an operation of the read address program counter 74 so as to read the data from the memory 72 at a 10-bit delayed timing.

The input data A2 is written into the memory 72 according to the write address produced by the write address program counter 73 which operates in synchronization with the input timing signal A1. And data A4 is read out from the memory 72 according to the read address produced by the read address program counter 74 which operates in synchronization with a timing signal to adjusted to the TST-internal timing signal N3.

In the rear timing change circuit TCM of the channel A, the rear timing change circuit TCM receives data A4 from the TST and an input timing signal A5. The timing supervising part 86 detects a phase difference between the timing signal A5 and the TST internal timing signal N3 generated in the time generator TG shown in FIG. 13, and produces a timing adjusting signal according to the phase difference to the timing adjusting part 85.

The timing adjusting part 75 controls the read address program counter 84 according to the received phase difference. For example, when the input timing signal A5 proceeds by ten bits from the TST internal timing signal N3, the timing adjusting part 85 adjusts an operation of the read address program counter 84 so as to read the data from the memory 82 at a 10-bit proceeded timing.

The input data A4 is written into the memory 82 according to the write address produced by the write address program counter 83 which operates in synchronization with the TST internal timing signal N3. Data A6 is read out from the memory 82 according to the read address produced by the read address program counter 84 which operates in synchronization with a timing signal to adjusted to the input timing signal A5.

The timing change circuits TCMs for other channels are operative in the same way as the above circuit for the channel A. In each of the channels, a data reading operation from the memory 72 and a data writing operation into the memory 82 are performed in synchronization with the TST internal timing signal N3.

Figure 24:
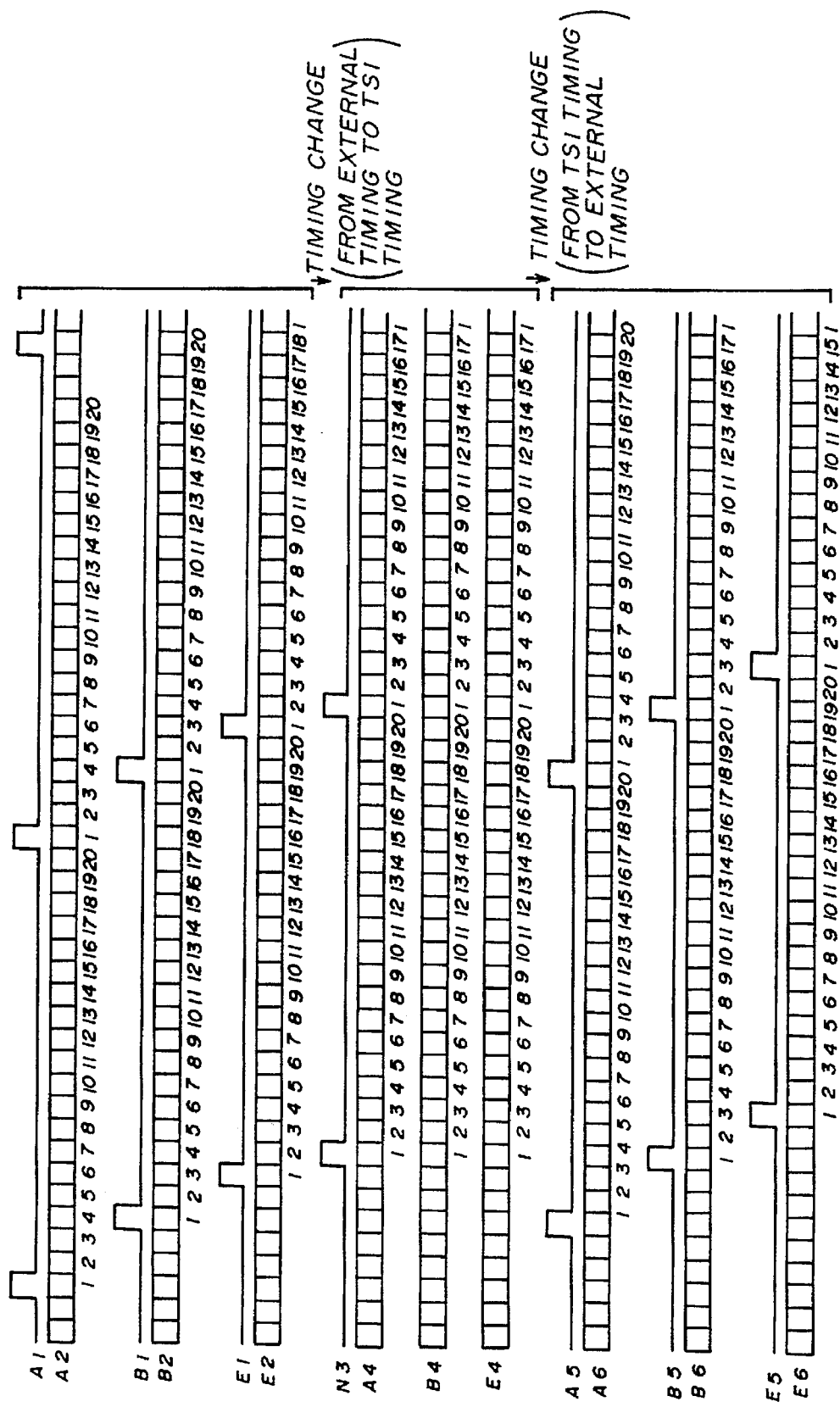
FIG. 24 shows timing charts for explaining an operation of the timing change circuit shown in FIG. 23.

FIG. 24 shows timing charts for explaining an operation of the timing change circuit. In FIG. 24, examples of the channels A, B, and E are represented. In FIG. 24, input data A2, B2, and E2 are respectively supplied to the front timing change circuits TCMs in synchronization with external timing signals A1, B1, and E1. The timing supervising parts of the channels A, B, and E detect the respective phase difference and adjust each generation timing of the read address in the same way mentioned above. As a result, the input data A2, B2, and E2 are adjusted to be data A4, B4, and E4 which are respectively in synchronization with the internal timing signal N3. These data are produced to the rear timing change circuit TCMs. In the rear timing change circuits TCMs, the timing supervising parts of the channels A, B, and E detect the respective phase difference between the external timing signals A5, B5, and E5 and the TST internal timing signal N3, and adjust each reading timing to read data A6, B6, and E6 in the same way mentioned above.

As a result, the read data A6, B6, and E6 are respectively in synchronization with the external timing signal A5, B5, and E5.

In this way, by the internal timing signal N3 which is different from the external timing signal, the TST may be operative. Therefore, the operation timing of the time-slot interchanger TSI may be designed without taking the external timing signal into account. As a result, it is possible to combine the time-slot interchanger TSI according to the present invention with a network which has already been constructed or has already been designed. Therefore, according to the present invention, the problem (3) existing in the prior art may be resolved.

Figure 7:
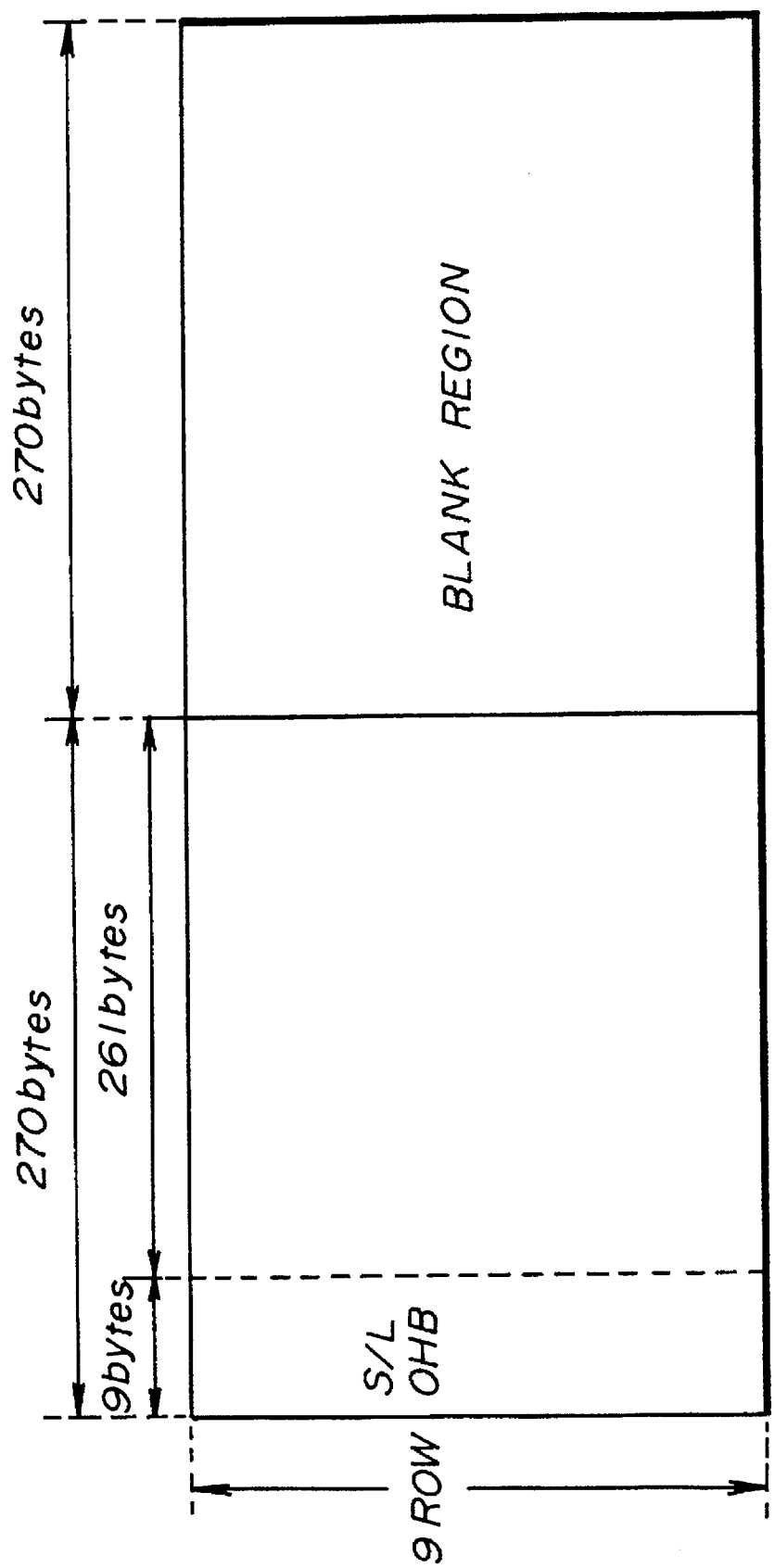
FIG. 7 shows a frame format of a signal STM-1 processed by the time-slot interchanger TSI shown in FIG. 3.
Figure 8B:
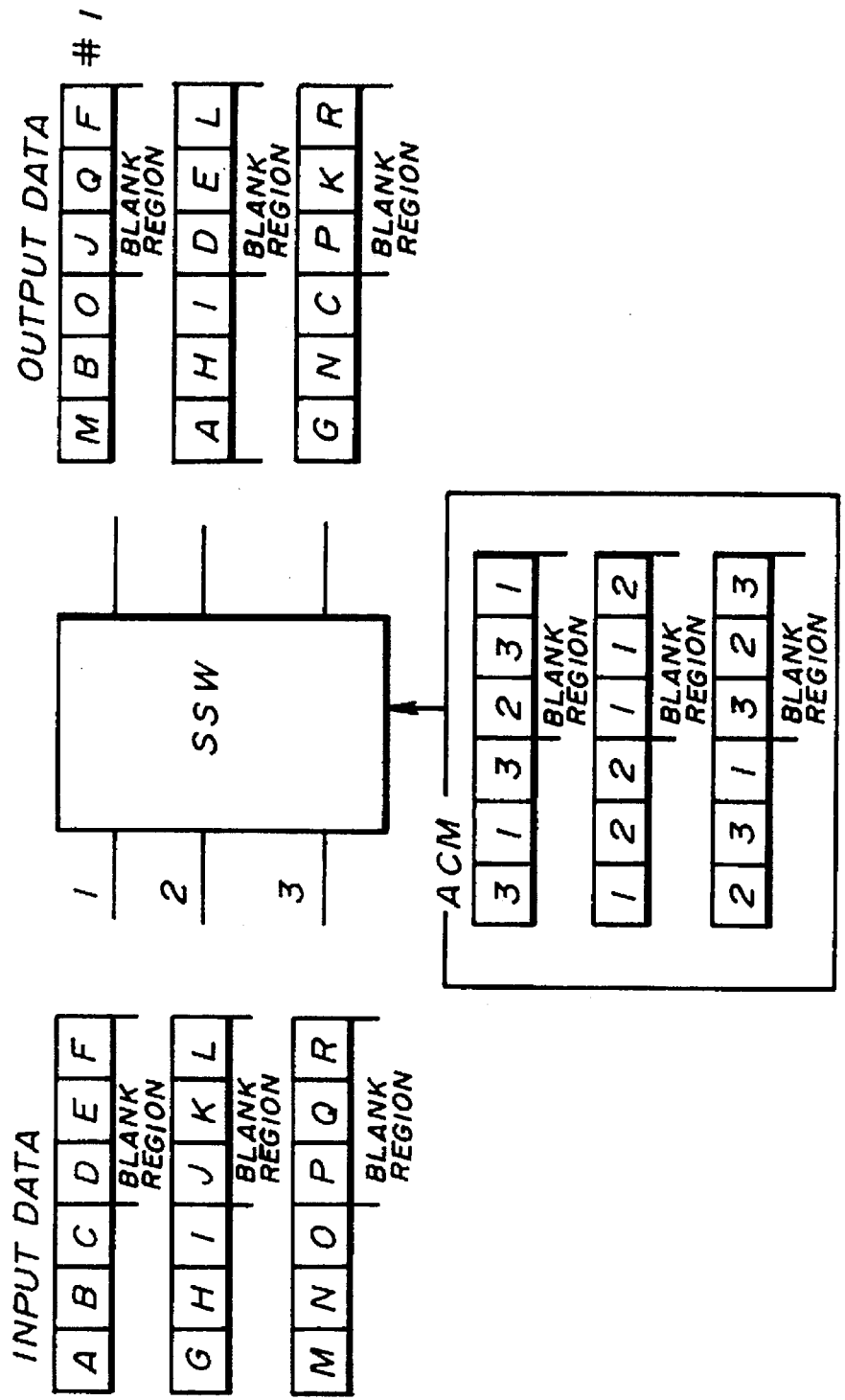
Figure 8C:
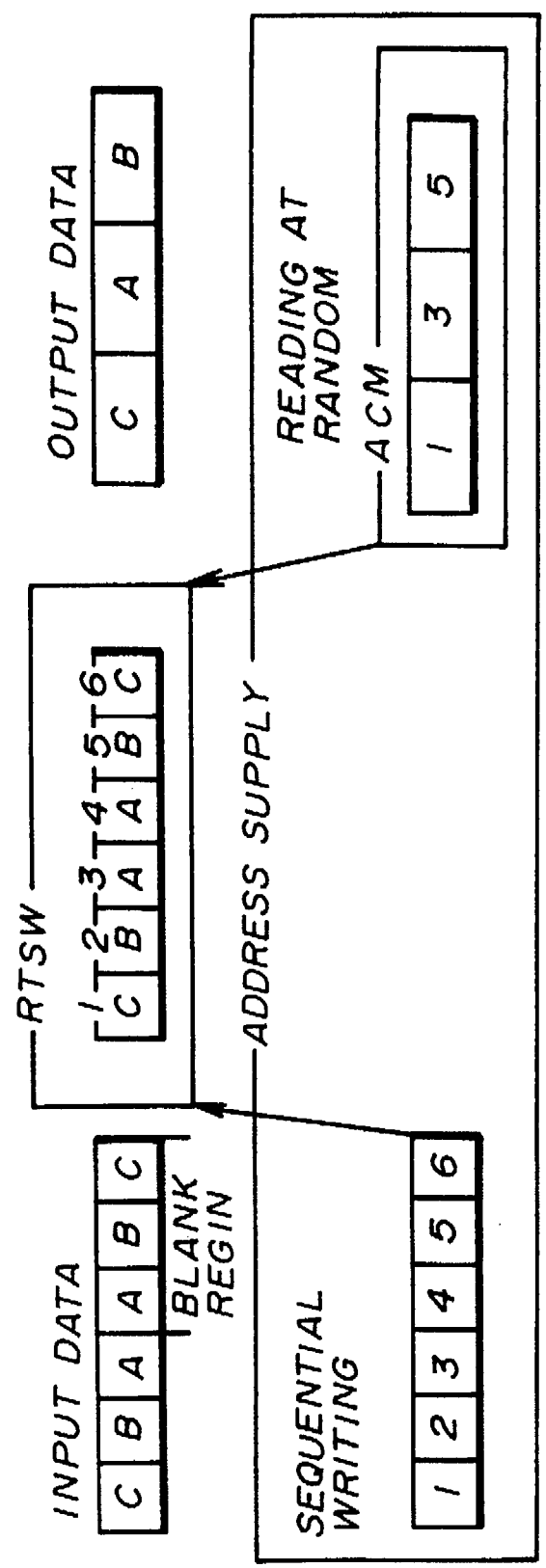
Figure 9:
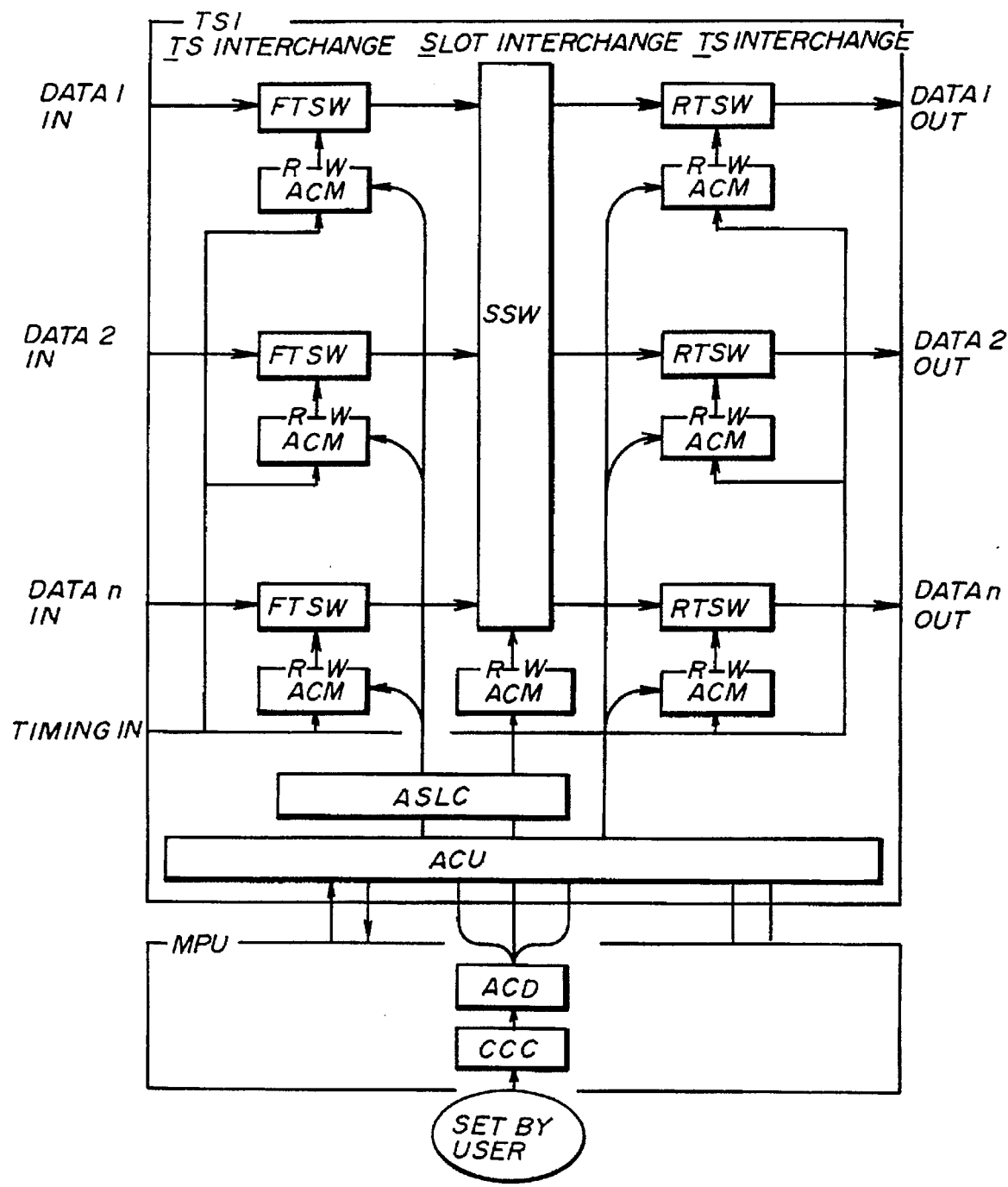
FIG. 9 shows a block diagram of the conventional time-slot interchanger TSI for realizing data processing shown in FIG. 8.

Next, a description will be given of a second embodiment of the time-slot interchanger according to the present invention. In the first embodiment of the time-slot interchanger TSI mentioned before, it is necessary to check whether the input data has been accurately cross-connected according to the circuit-cross-connecting information (which is called a pass check). The second embodiment has an advantage of a simple pass check. Also in the conventional TSI, the pass-check function is installed. In general, for the pass check, non-defined bits in the overhead region OHB of the frame format shown in FIG. 7 are used. However, this method can not be applied to a system in which the data is transmitted in other frame formats. In such a system, for each different frame format, there is a need for a respective design for the pass-check function. A disadvantage of this method is the lack of flexibility. And when the non-defined bits are used for other requests, the pass-check function using the overhead region OHB may not be realized.

Taking account of the above, the second embodiment according to the present invention uses a simple pass-check function having flexibility.

Figure 25:
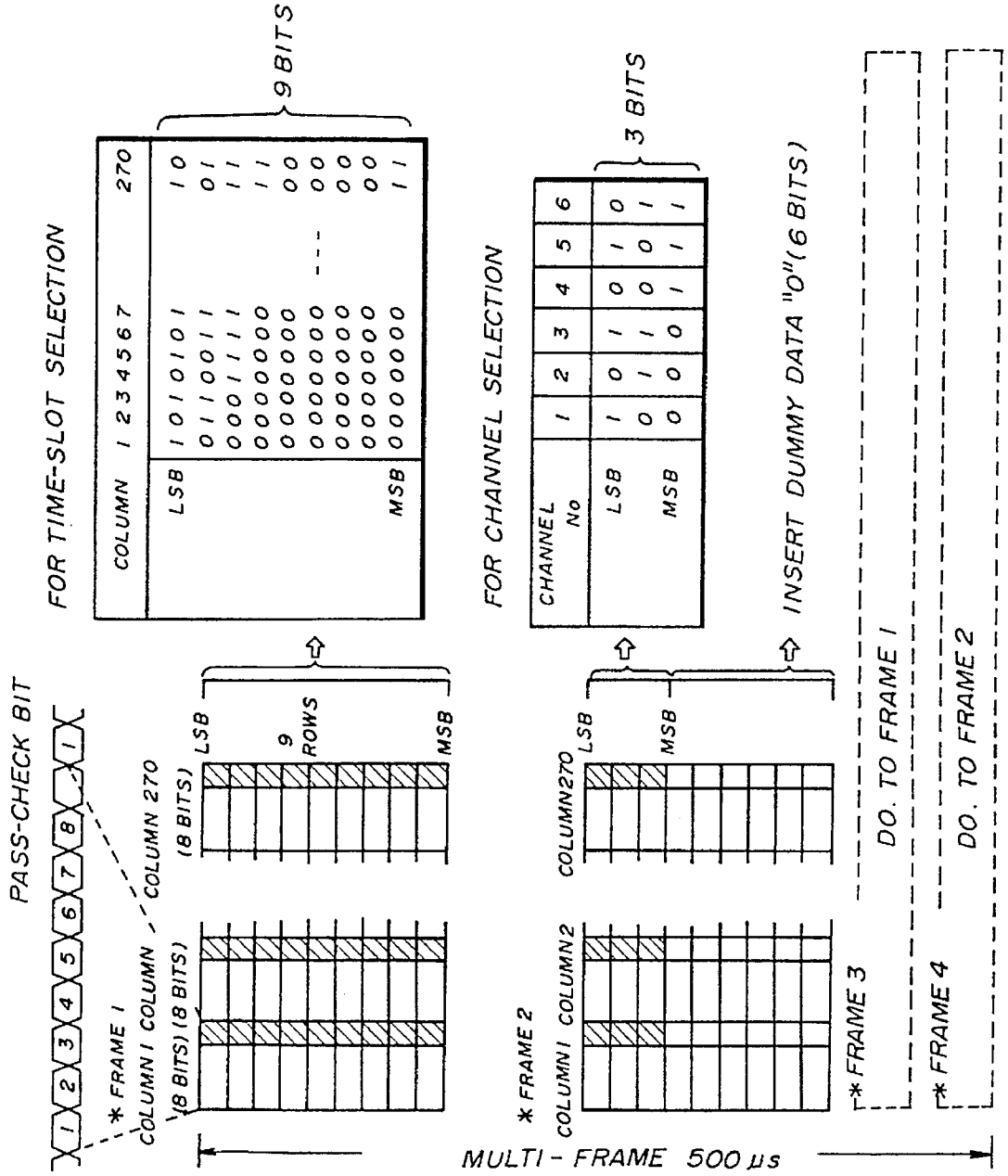
FIG. 25 shows an illustration representing a pass-check bit allotment of a second embodiment of the time-slot interchanger according to the present invention.

FIG. 25 shows an illustration representing a pass-check bit allotment of the second embodiment of the time-slot interchanger according to the present invention. In FIG. 25, in the same way shown in FIG. 7, one frame is formed by 270 bytes (column)×9 ROWs, and 4 frames forms 1 multi-frame (corresponding to 500 μsec). In the first embodiment, 2 frames include the blank region having an amount of 1 frame. In such a format, a 1-bit check bit region is added to each column unit (8-bit unit). This check-bit region is added to each of all columns (270 columns) in a 2-frame (250 μsec) unit (9 ROWS×2). Namely, for 2 frames, a check-bit additional region of 18 bits per 1 column is set. Now, since 1 frame has 270 columns, for checking a selection of the 270 time slots, 9 bits are necessary. And if the time-slot interchanger TSI processes 6 channels, 3 bits are necessary for checking a selection of the 6 channels. Thus, in the above, in the check-bit additional region of 18 bits per 1 column for 2 frames, a total of 12 bits is used for pass-check bits, and the remaining 6 bits are used for dummy data (zero). The above pass-check (bits 12) bits are set in order from a least significant bit LSB of a frame 1.

The 9 bits for checking the time slot selection are set by predetermined fixed values from a column 1 to a column 270, as shown in FIG. 25. For example, in a first ROW of the frame 1, check bits of 1, 0, 1, 0, . . . are inserted in order from the column 1.

The 3 bits for checking the channel selection are set in a first 3 ROWS of the frame 2, each of which has a value according to each channel number. For example, if the data of the column 1 of the first ROW in the frame 2 is cross-connected to a channel 3, the checking bit of the channel selection "1 (LSB), 1, 0 (MSB)" is set for the check-bit additional region.

In the pass-check function of the time-slot interchanger TSI, the above-mentioned setting process of the pass-check bits is performed in the front time switch FTSW, and in the rear time switch RTSW, the check bits are detected to be compared with expected values.

Figure 26:
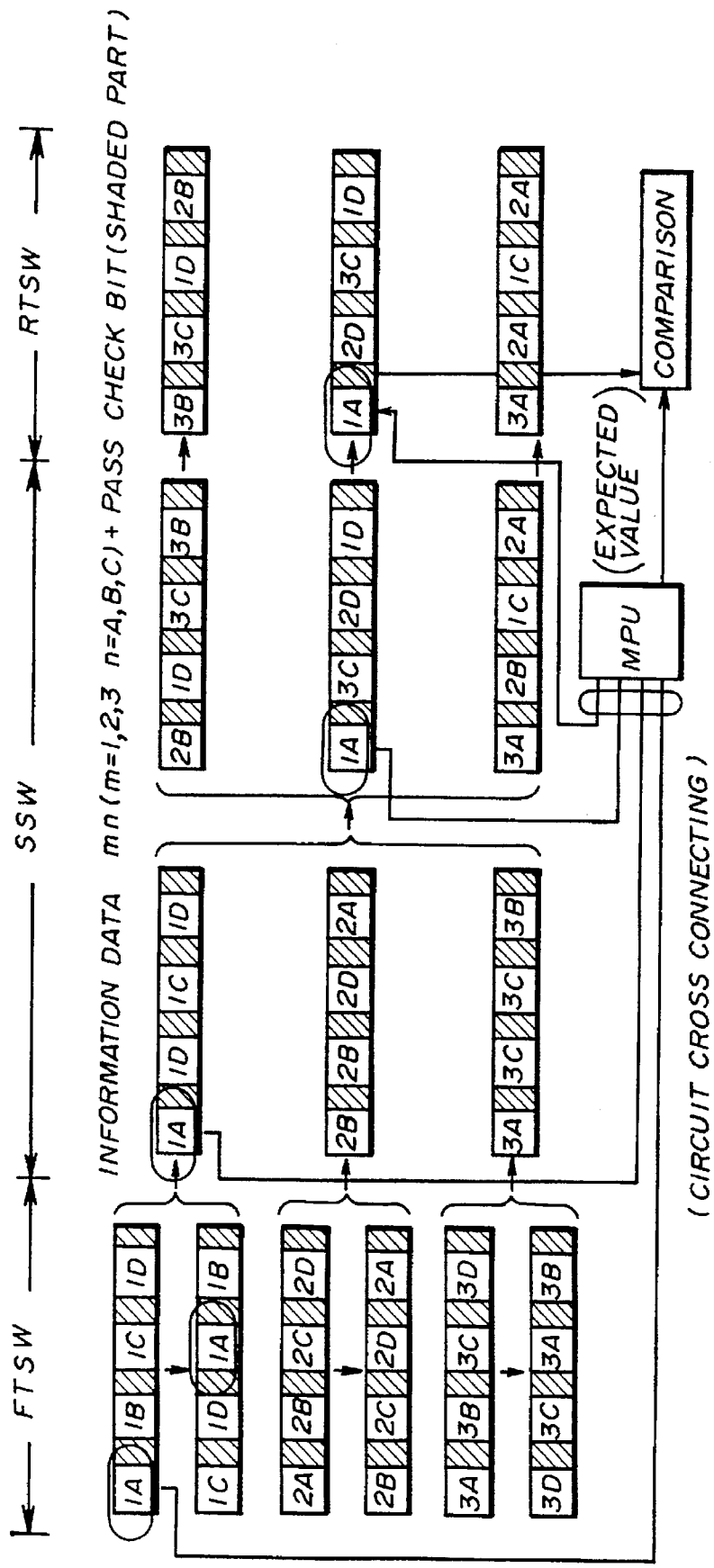
FIG. 26 shows an illustration for explaining an operation of a pass-check function of the second embodiment of the time-slot interchanger according to the present invention.

FIG. 26 shows an illustration for explaining an operation of the pass-check function of the second embodiment of the time-slot interchanger according to the present invention. In FIG. 26, 1A to 1D, 2A to 2D, and 3A to 3D indicate, respectively, data (information) to be transmitted, and shaded parts indicate the pass-check bits. In this description, for simplification, it is shown that the pass-check bits are added not in the parallel switching process shown in the first embodiment but in a conventional switching process. However, it is noticed that the operation described here is also applied to the parallel switching process.

The front time switch FTSW interchanges the time slots in the time scale according to the circuit-cross-connecting information supplied from the MPU. Each time slot corresponds to 1 column shown in FIG. 25. To each time slot, 1-bit pass-check bit is added. The time slot interchanging is performed with the pass-check bit. The space switch SSW interchanges the received time slots with the pass-check bit in the space scale according to the circuit-cross-connecting information supplied from the MPU. The rear time switch RTSW interchanges the received time slots with the pass-check bit in the time scale according to the circuit-cross-connecting information. And the MPU compares the pass-check bits in each time slot or in certainly selected time slots with the expected values. If the MPU specifies the channel and time slot location from the circuit-cross-connecting information, the MPU may know what the time slot arrives. Therefore, the MPU may know previously the pass-check bit (expected value) which was added in the front time switch FTSW. When the comparison result is an identification, it shows that the data is accurately cross-connected and interchanged. When the comparison result is not the identification, it shows that the data to be transmitted didn't arrive, and some trouble occurred in the TSI.

Figure 27:
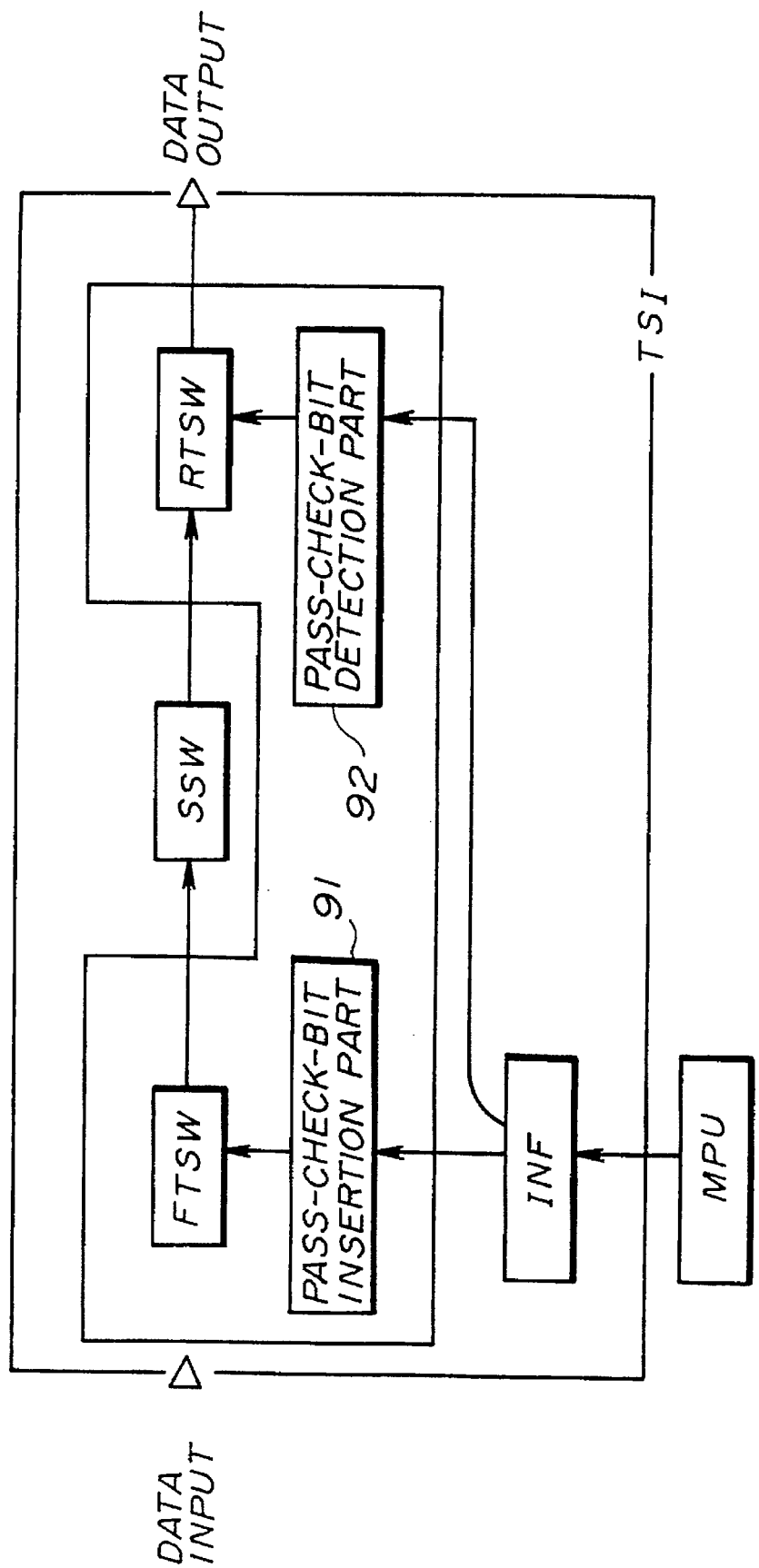
FIG. 27 shows a block diagram of a main configuration of the second embodiment of the time-slot interchanger TSI according to the present invention.

FIG. 27 shows a block diagram of a main configuration of the second embodiment of the time-slot interchanger TSI according to the present invention. As shown in FIG. 27, a pass-check-bit insertion part 91 is installed for the front time switch FTSW, and a pass-check-bit detection part 92 is installed for the rear time switch RTSW. The pass-check-bit detection part 92 detects the pass-check bit and compares it with the expected value. A block encompassing the front and rear time switches FTSW, RTSW, the pass-check-bit insertion part 91 and the pass-check-bit detection part 92 corresponds to one channel. The INF is an interface between the MPU and the time-slot interchanger TSI, and corresponds to the access control unit ACU, the ACM-access-selection control unit ASLC, etc.

Figure 28:
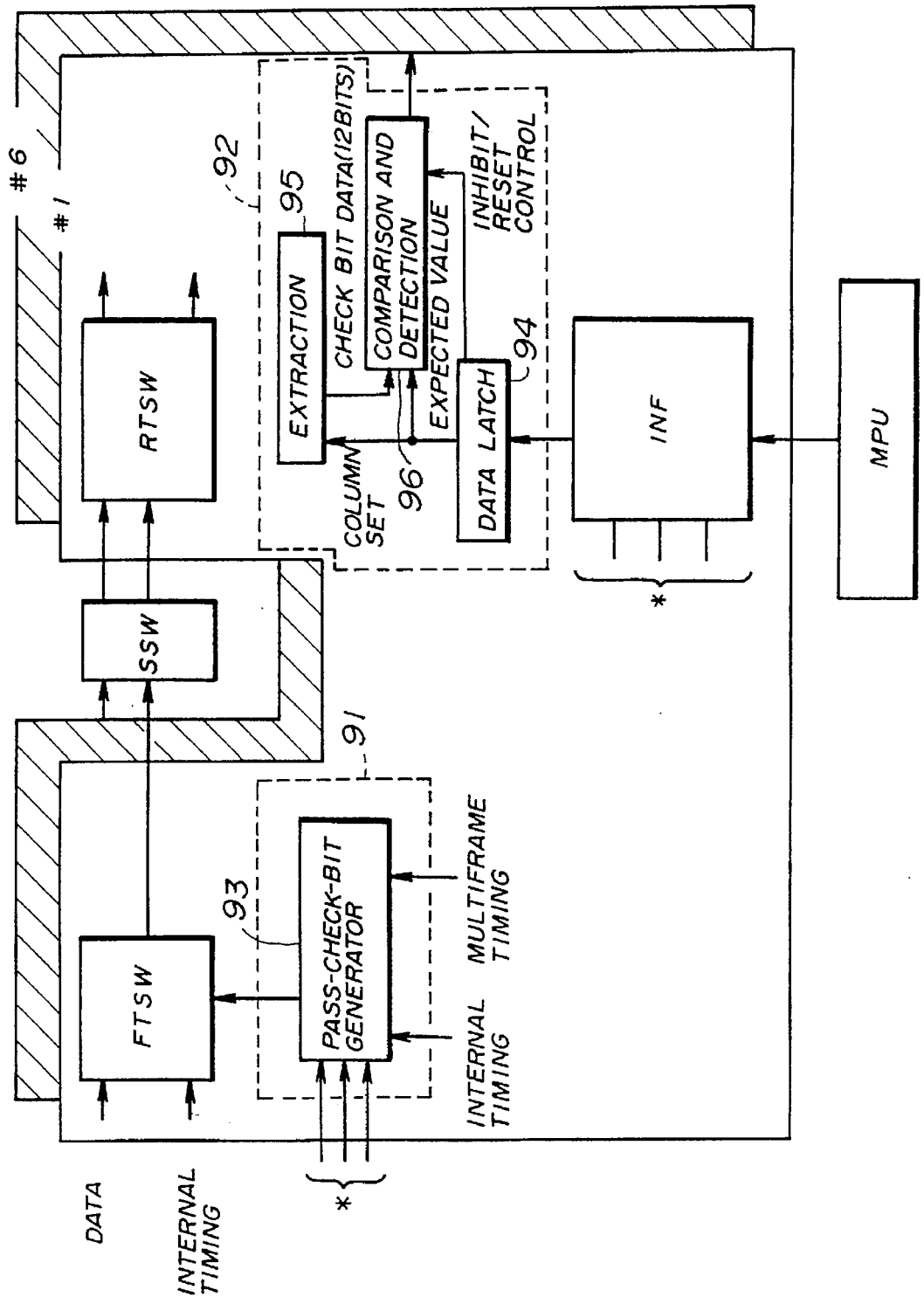
FIG. 28 shows a block diagram of a detail configuration of the second embodiment of the time-slot interchanger TSI shown in FIG. 27
Figure 29:
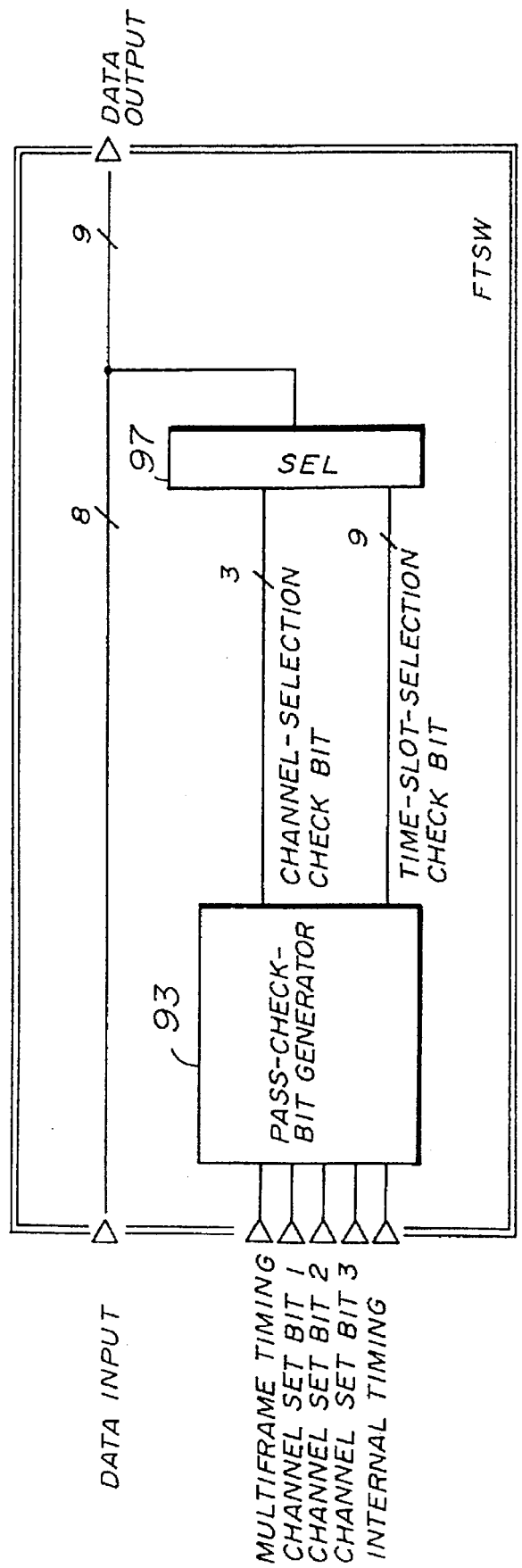
FIG. 29 shows a block diagram of a detail configuration of a pass-check-bit insertion part shown in FIG. 28.

FIG. 28 shows a block diagram of a detail configuration of the second embodiment of the time-slot interchanger TSI shown in FIG. 27. And FIG. 29 shows a block diagram of a detail configuration of the pass-check-bit insertion part shown in FIG. 28. The pass-check-bit insertion part 91 comprises a pass-check-bit generator 93. The pass-check-bit generator 93 receives channel set bits 1 to 3, an internal timing signal, and a multiframe timing signal. The pass-check-bit generator 93 stores two tables shown in FIG. 25, and supplies the time-slot-selection check bit (9-bit parallel), and the channel-selection check bit (3-bit parallel) to a selector (SEL) 97 according to the address signal of the channel set bits 1 to 3, the internal timing signal, and the multiframe timing signal. Further, the pass-check-bit generator 93 also produces the dummy bit ("0") (not shown). The selector 97 selects the time-slot-selection check bit, the channel-selection bit and the dummy bit according to the multiframe timing signal and the internal timing signal, and adds it to the input data. When corresponding the selector 97 shown in FIG. 29 to the block diagram shown in FIG. 28, the selector 97 is located in the front time switch FTSW shown in FIG. 28. And the data input shown in FIG. 29 corresponds to the output signal of the timing change circuit TCM shown in FIG. 13.

The pass-check-bit detection part 92 shown in FIG. 28 comprises a data latch 94, a check-bit extraction part 95, and a comparison-and-detection part 96. The data latch 94 receives a column set signal for setting a column to be checked, a channel set signal for setting a channel to be checked, and an expected value derived from the circuit-cross-connecting information from the MPU through the interface, and latches them. The check-bit-extraction part 95 receives the column set signal, and reads out the check bit data (12 bits) of the set column from the data which was processed in the rear time switch RTSW to supply it to the comparison-and-detection part 96. The comparison-and-detection part 96 receives the expected value from the data latch 94 and compares it with the check bit data from the check-bit-extraction part 95. When the check bit data is not identical to the expected value, the comparison-and-detection part 96 produces a pass check result indicating an error. And when the column set signal received from the MPU designates a column 0, the data latch 94 produces an inhibit/reset control signal to the comparison-and-detection part 96 to reset it to an initial condition (a condition permitted to receive a circuit-interchange request). By setting the column, there is no need to check all columns. Therefore, a large amount of storage capacity is not required for the data latch 94. Thus, the pass check may be effectively carried out.

Figure 30:
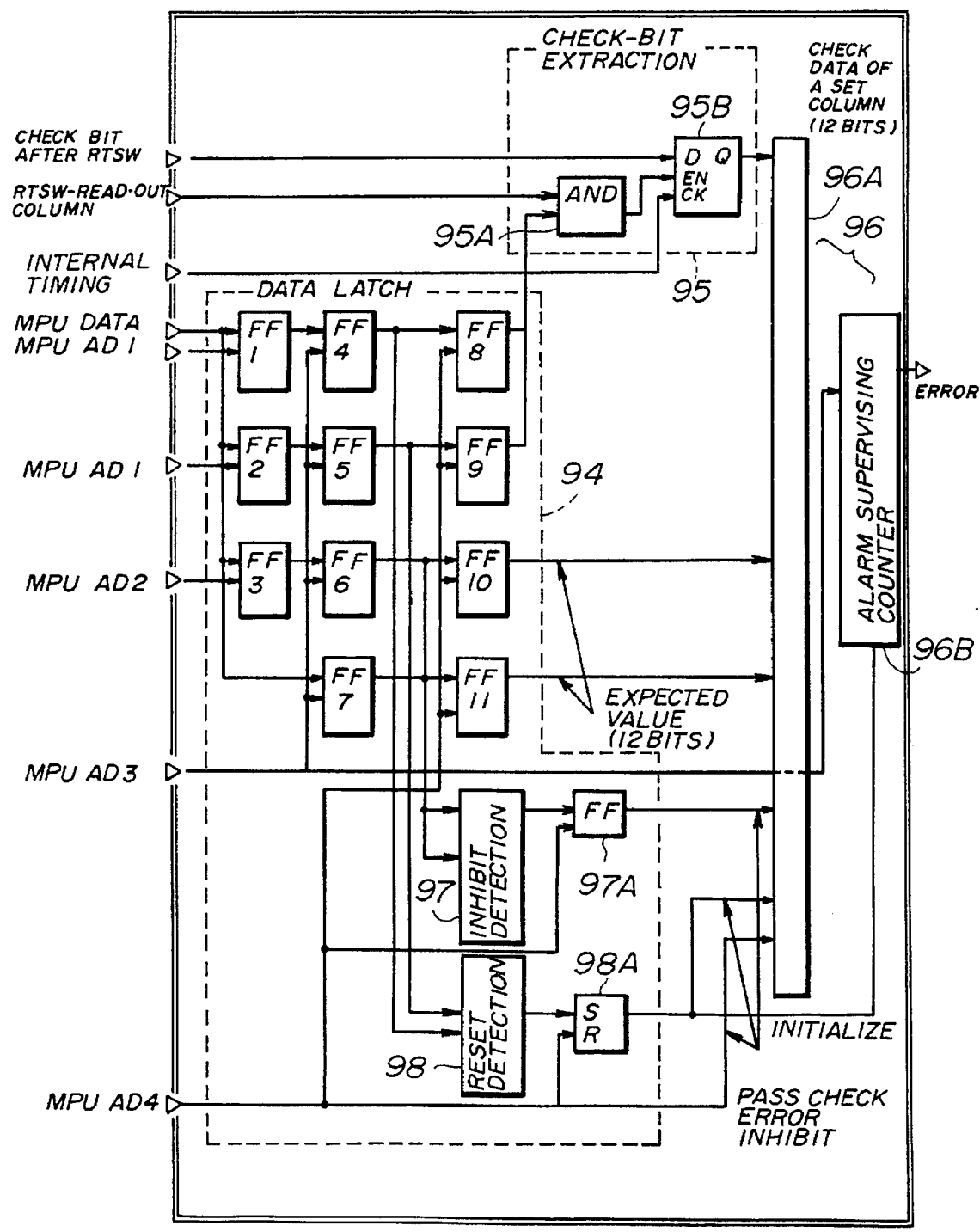
FIG. 30 shows a block diagram of a detail configuration of a pass-check-bit detection part shown in FIG. 28.

FIG. 30 shows a block diagram of a detail configuration of the pass-check-bit detection part 92 shown in FIG. 28. The data latch 94 comprises flip-flops FF1 to FF11 as shown in FIG. 30. The flip-flops FF1 to FF3 and FF7 receive the MPU data. In further detail, the flip-flops FF1, FF2 receive the column set signal and the flip-flop FF3 receives the expected value of the time-slot-selection check bit, and the flip-flop FF7 receives the expected value of the channel-selection check bit. The flip-flops FF1 to FF7 latch only necessary data of the MPU data in synchronization with address signals AD1 to AD4 from the MPU. The flip-flops FF8 to FF11 operate in synchronization with a 2-frame timing signal indicating a timing of each 2 frames. Therefore, the flip-flops FF8, FF9 supply the 9-bit column set signal to check-bit extraction part 95 each 2 frames, and the flip-flops FF10, FF11 supply the 12-bit expected value of the pass-check bit to the comparison-and-detection part 96 each 2 frames.

The check-bit extraction part 95 comprises an AND gate 95A and a D-type flip-flop 95B. The AND gate 95A compares a signal indicating a column of the data read out from the rear time switch RTSW, with the column set signal. And only when both are the same, the AND data 95A enables the flip-flop 95B. In this case, in synchronization with the internal timing signal, the flip-flop 95B latches the pass-check bit (12 bits) which was read out from the rear time switch RTSW, and supplies it to the comparison-and-detection part 96.

The comparison-and-detection part 96 comprises a comparator 96A and an alarm supervising counter 96B. The alarm supervising counter 96B performs a count operation each column in synchronization with the MPU address AD4. The comparator 96A compares the detected pass-check bit (12 bits) and the 12-bit expected value. And only when the both are not identical to each other, the comparator 96A produces a signal to the alarm supervising counter 96B. In response to this signal, the alarm supervising counter 96B produce a present counting number. Therefore, the column number including the error is produced.

The reset detection part 98 installed in the data latch 94 supplies, only when the column numbers produced from the flip-flops FF4, FF5 indicate zero, a signal to a following RS-type flip-flop 98A and the comparator 96A. And the RS-type flip-flop 98A transmits a signal to the alarm supervising counter 96B to reset it. Further, the comparator 96A is set to a condition that no signal transmittance to the alarm supervising counter 96B is permitted. An inhibit detection part 97 installed in the data latch 94 invalidates the comparison result when the all expected values produced from the flip-flops FF6, FF7 are zeros.

In the description of the first embodiment, the configuration, that the double of the amount of the input data is read out in parallel in the two systems, is shown. However, a configuration, that n times the amount of the input data is read in n systems and in parallel, may be also applied to the first embodiment.

Further, the present invention is not limited to these embodiments, but various variations and modifications may be made without departing from the scope of the present invention.

What is claimed is:

1. A time-slot interchanger comprising:

first and second time switches: and a space switch installed between the first and second time switches;

wherein:

the first time switch comprises first means for supplying data, which is produced by adding a blank region to input data supplied to the first time switch, in n systems (n is an integer), in parallel to said space switch; and said second time switch comprises second means for supplying output data, which is produced by removing said blank region from data received in the n systems and in parallel from the space switch.

2. The time-slot interchanger as claimed in claim 1, wherein said data produced in the n systems and in parallel from the first time switch has the same bit rate as that of said input data supplied to the first time switch.

3. The time-slot interchanger as claimed in claim 1, wherein said data produced in the n systems and in parallel from the first time switch has n times an amount of said input data supplied to the first time switch.

4. The time-slot interchanger as claimed in claim 2, wherein said data produced in the n systems and in parallel from the first time switch has n times an amount of said input data supplied to the first time switch.

5. The time-slot interchanger as claimed in claim 1, wherein said first means comprises a memory having one write port and n read ports, and the first means reads out the data from the memory by providing n read addresses to supply the data to the space switch.

6. The time-slot interchanger as claimed in claim 1, wherein said second means comprises a memory having n write ports and one read port, and the second means writes the data produced from the space switch in n systems and in parallel into the memory by supplying one write address.

7. The time-slot interchanger as claimed in claim 1, wherein said space switch comprises n memories, and stores the data read out from said first time switch in the n systems and in parallel.

8. The time-slot interchanger as claimed in claim 1, wherein said first means comprises n memories having one write port and one read port, and the first means writes the data supplied to the first means into the n memories and reads out them by respectively supplying n write addresses and n read addresses.

9. The time-slot interchanger as claimed in claim 1, wherein said second means comprises n memories having one write port and one read port and selection means for selecting one of the data read out from the n memories, and the second means writes the data produced from the space switch in n systems and in parallel into the n memories by supplying n write addresses and reads the data by supplying n read addresses, and further removes said blank region by selecting in the selection means.

10. The time-slot interchanger as claimed in claim 1, wherein:

said first means comprises two memories for alternatively writing the input data and alternatively reading;

said space switch comprises two memories for alternatively writing the data produced from the first means and alternatively reading; and said second means comprises two memories for alternatively writing the data produced from the space switch and alternatively reading.

11. The time-slot interchanger as claimed in claim 1, wherein said time-slot interchanger comprises:

first timing change means, set before said first time switch, for synchronizing the input data supplied to the first time switch to an internal timing signal; and second timing change means, set after said second time switch, for synchronizing the output data produced from the second time switch to an external timing signal.

12. The time-slot interchanger as claimed in claim 1, wherein said time-slot interchanger comprises:

pass-check-bit insertion means for adding a pass-check bit to the input data supplied to the first time switch; and pass-check-bit detection means for detecting said pass-check bit added to the output data produced from the second time switch, and for determining whether or not the data is accurately cross-connected by comparing with an expected value.

13. The time-slot interchanger as claimed in claim 12, wherein said pass-check-bit insertion means comprises means for adding the pass-check bit each given unit of the input data supplied to the first time switch.

14. The time-slot interchanger as claimed in claim 12, wherein said time-slot interchanger further comprises means for setting data to be detected, and said pass-check-bit detection means compares the pass-check bit which is added to set data with the expected value.

* * * * *